United States Patent
Hirai

(10) Patent No.: US 9,703,508 B2
(45) Date of Patent: Jul. 11, 2017

(54) MANAGING APPARATUS, MANAGING METHOD, AND STORAGE MEDIUM STORING PROGRAM

(71) Applicant: CANON KABUSHIKI KAISHA, Tokyo (JP)

(72) Inventor: Masahito Hirai, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 129 days.

(21) Appl. No.: 14/698,002

(22) Filed: Apr. 28, 2015

(65) Prior Publication Data
US 2015/0331475 A1     Nov. 19, 2015

(30) Foreign Application Priority Data

May 13, 2014 (JP) ................................. 2014-099831
Mar. 31, 2015 (JP) ................................. 2015-073217

(51) Int. Cl.
*G06F 1/32* (2006.01)
*G06F 3/12* (2006.01)

(52) U.S. Cl.
CPC .......... *G06F 3/1221* (2013.01); *G06F 1/3206* (2013.01); *G06F 1/329* (2013.01); *G06F 1/3284* (2013.01); *Y02B 60/1267* (2013.01); *Y02B 60/144* (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| | | | | |
|---|---|---|---|---|
| 6,457,132 B1* | 9/2002 | Borgendale | ........... | G06F 1/3203 713/320 |
| 6,801,730 B2* | 10/2004 | Johnson | ............. | G03G 15/5004 399/75 |
| 8,099,613 B2* | 1/2012 | Suzuki | ............... | G03G 15/5004 713/320 |
| 8,594,648 B2* | 11/2013 | Musial | .................... | H04M 3/00 455/418 |
| 8,964,744 B2 | 2/2015 | Hirai | ........................... | 370/390 |

(Continued)

FOREIGN PATENT DOCUMENTS

JP     2005-250960 A     9/2005

*Primary Examiner* — Zahid Choudhury
(74) *Attorney, Agent, or Firm* — Fitzpatrick, Cella, Harper & Scinto

(57) ABSTRACT

A managing apparatus controls the power status of an image forming apparatus in accordance with a notification of event occurrence from the image forming apparatus. Upon receiving the notification, it is determined whether the first power status of the image forming apparatus according to a schedule and the second power status of the image forming apparatus controlled based on the notification match each other. Upon determining that the power statuses do not match, the first power status or the second power status is selected based on priority information. When the first power status is selected, the managing apparatus prohibits control of the power status of the image forming apparatus. When the second power status is selected, the managing apparatus invalidates control of the power status of the image forming apparatus according to the schedule.

13 Claims, 24 Drawing Sheets

(56) References Cited

U.S. PATENT DOCUMENTS

| | | | |
|---|---|---|---|
| 2003/0009705 A1* | 1/2003 | Thelander | G06F 1/3203 |
| | | | 713/340 |
| 2003/0227642 A1* | 12/2003 | Anderson | G06F 1/3203 |
| | | | 358/1.13 |
| 2004/0243865 A1* | 12/2004 | Owen | G06F 1/3203 |
| | | | 713/320 |
| 2008/0144086 A1* | 6/2008 | Shibao | H04N 1/00244 |
| | | | 358/1.15 |
| 2012/0210150 A1* | 8/2012 | de Lind van Wijngaarden | |
| | | | G06F 1/3212 |
| | | | 713/320 |

* cited by examiner

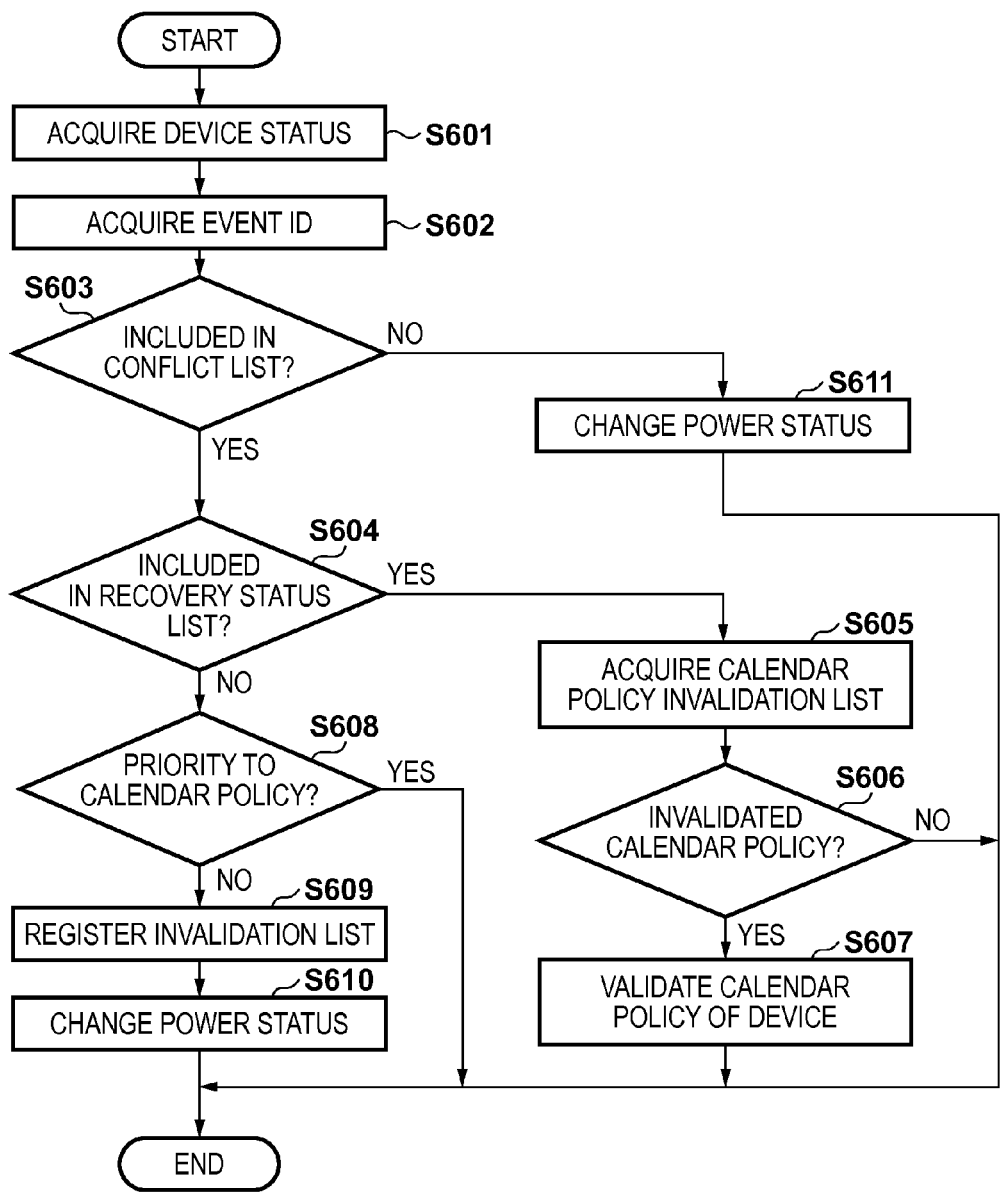

FIG. 8

| Device ID | Device Name | IP address |
|---|---|---|
| 12345678 | ir 2233 | 192.168.2.2 |
| 12345688 | ir 2235 | 192.168.2.4 |

| Event ID | Event Name | RequestPowerStatus | compornent |
|---|---|---|---|
| 10 | paper jam | standby | finisher |
| 11 | operater call | soft power off | system |

901 · Event ID
902 · Event Name
903 · RequestPowerStatus
904 · compornent

FIG. 9B

| Event ID | Event | RequestPowerStatus | compornent |
|---|---|---|---|
| 10 | paper jam | standby | finisher |
| 11 | operater call | soft power off | system |

911 · Event ID
912 · Event
913 · RequestPowerStatus
914 · compornent

FIG. 9C

| Event ID | Event Name | RequestPowerStatus | compornent |
|---|---|---|---|
| 1 | paper jam | power off | system |
| 2 | paper jam recovery | power on | system |

FIG. 9D

| Event ID | Event Name | RequestPowerStatus | compornent |
|---|---|---|---|
| 1 | toner low | sleep | marker |
| 2 | toner low recovery | power on | marker |

FIG. 10A

| Calendar ID | Start | PowerStatus | compornent |
|---|---|---|---|
| 1 | daily, 9:00 | power on | system |
| 2 | daily, 22:00 | power off | system |

FIG. 10B

| Calendar ID | Start | PowerStatus | compornent |
|---|---|---|---|
| 1 | daily, 9:00 | power on | system |
| 2 | daily, 22:00 | power off | system |

FIG. 10C

| Calendar ID | Start | PowerStatus | compornent |
|---|---|---|---|
| 1 | anyday, 9:00 | power on | system |
| 2 | anyday, 22:00 | power off | system |

FIG. 10D

| Calendar ID | Start | PowerStatus | compornent |
|---|---|---|---|
| 1 | anyday, 9:00 | power on | system |
| 2 | anyday, 22:00 | sleep | system |
| 3 | anyday, 12:00 | sleep | system |
| 4 | anyday, 13:00 | power on | system |

FIG. 11A

```
┌─────────────────────────────────────────────────────────────────┐
│ POWER POLICY SETTING - CONFLICT CONDITION CONFIRMATION      [X] │
├─────────────────────────────────────────────────────────────────┤
│ SETTING CONTENTS CONFLICT WITH EVENT POLICY TO BE ADDED.        │
│ DO YOU WANT TO AVOID CONFLICT?                                  │
│                                                                 │
│ PRIORITY IS GIVEN TO CHANGE TO PowerOff IN CASE OF paper jam.   │
│ CHECK IF YOU GIVE PRIORITY TO CALENDAR POLICIES BELOW           │
│                                                                 │
│        ☐ SET "PowerOn" AT 9:00 "EVERY DAY" ACCORDING TO CALENDAR│
│        ☐ SET "sleep" AT 12:00 "EVERY DAY" ACCORDING TO CALENDAR │
│                                                                 │
│                                         (  OK  )  ( CANCEL )    │
└─────────────────────────────────────────────────────────────────┘
     1101                                    1102       1103
```

FIG. 11B

```
┌─────────────────────────────────────────────────────────────────┐
│ POWER POLICY SETTING - CONFLICT CONDITION CONFIRMATION      [X] │
├─────────────────────────────────────────────────────────────────┤
│ SETTING CONTENTS CONFLICT WITH EVENT POLICY TO BE ADDED.        │
│ DO YOU WANT TO AVOID CONFLICT?                                  │
│                                                                 │
│ PRIORITY IS GIVEN TO SET "PowerOn" AT 9:00 "EVERY DAY"          │
│ ACCORDING TO CALENDAR.                                          │
│ CHECK IF YOU GIVE PRIORITY TO EVENT POLICIES BELOW              │
│                                                                 │
│        ☐ CHANGE TO PowerOff IN CASE OF paper jam                │
│        ☐ CHANGE TO sleep IN CASE OF No paper                    │
│                                                                 │
│                                         (  OK  )  ( CANCEL )    │
└─────────────────────────────────────────────────────────────────┘
     1111                                    1112       1113
```

FIG. 12A

| | 1201 | 1202 | 1203 | 1204 |
|---|---|---|---|---|
| | ID | Event ID | Calendar ID | Priority |
| | 1 | 12121 | 22 | Event |
| | 2 | 12141 | 44 | Calendar |

FIG. 12B

| ID | Event ID | Calendar ID | Priority |
|---|---|---|---|
| 1 | 1 | 1 | Event |
| 2 | 2 | 2 | Calendar |

FIG. 12C

| ID | Event ID | Calendar ID | Priority |
|---|---|---|---|
| 1 | 1 | 1 | Event |
| 2 | 1 | 4 | Event |
| 3 | 2 | 2 | Calendar |
| 4 | 2 | 3 | Calendar |

FIG. 13

| Calendar ID (1301) | Event ID (1302) |
|---|---|
| 1 | 3 |
| 2 | 5 |

FIG. 14A

| |
|---|
| 0(SNMP VERSION) |
| Public(COMMUNITY NAME) |
| 0xA3(SetRequest) ~1401 |
| INTEGER(Request ID) |
| powMonitorIndex |
| system(5) ~1402 |
| powEventIndex |
| 1 |
| powEventRequestPowerState |
| suspend(40) ~1403 |
| powEventName |
| "JAM" ~1404 |
| powEventRowStatus |
| CreateAndGo(4) ~1405 |

FIG. 14B

| |
|---|
| 0(SNMP VERSION) |
| Public(COMMUNITY NAME) |
| 0xA3(SetRequest) |
| INTEGER(Request ID) |
| powMonitorIndex |
| system(5) |
| powEventIndex |
| 1 |
| powEventRequestPowerState |
| suspend(40) |
| powEventName |
| "JAM" |
| powEventRowStatus |
| Destroy(6) ~1411 |

F I G. 15A

| |
|---|
| 0(SNMP VERSION) |
| Public(COMMUNITY NAME) |
| 0xA3(SetRequest) |
| INTEGER(Request ID) |
| powMonitorIndex |
| system(5) |
| powCalendarIndex |
| 1 |
| powCalendarRequestPowerState |
| offSoft(80) |
| powCalendarDayOfWeek |
| any(8) |
| powCalendarHour |
| 22 |
| powCalendarMinute |
| 0 |
| powCalendarRowStatus |
| CreateAndGo(4) |

1501
1502
1503
1504
1505
1506
1507

F I G. 15B

| |
|---|
| 0(SNMP VERSION) |
| Public(COMMUNITY NAME) |
| 0xA3(SetRequest) |
| INTEGER(Request ID) |
| powMonitorIndex |
| system(5) |
| powCalendarIndex |
| 1 |
| powCalendarRequestPowerState |
| offSoft(80) |
| powCalendarDayOfWeek |
| any(8) |
| powCalendarHour |
| 22 |
| powCalendarMinute |
| 0 |
| 2powCalendarRowStatus |
| Destroy(6) |

| |
|---|
| 0(SNMP VERSION) |
| Public(COMMUNITY NAME) |
| 0xA3(SetRequest) |
| INTEGER(Request ID) |
| powMonitorIndex |
| system(5) |
| powRequestPowerState |
| suspend(40) |

1601 — 0xA3(SetRequest)
1602 — system(5)
1603 — suspend(40)

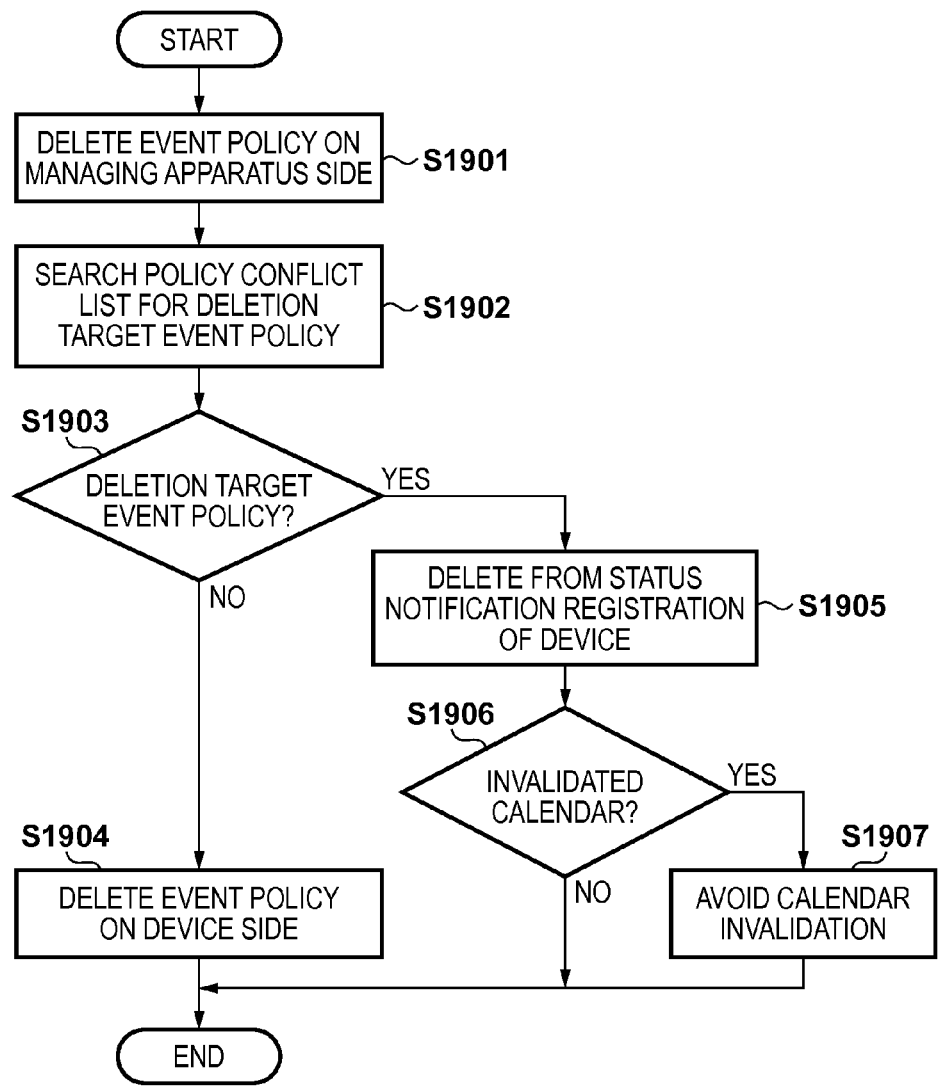

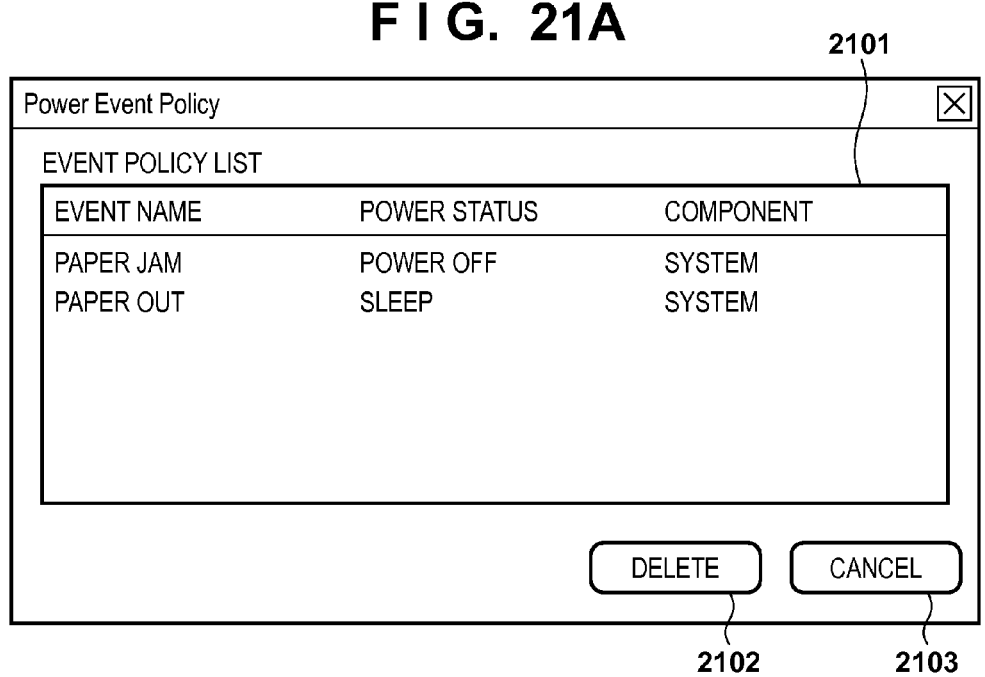
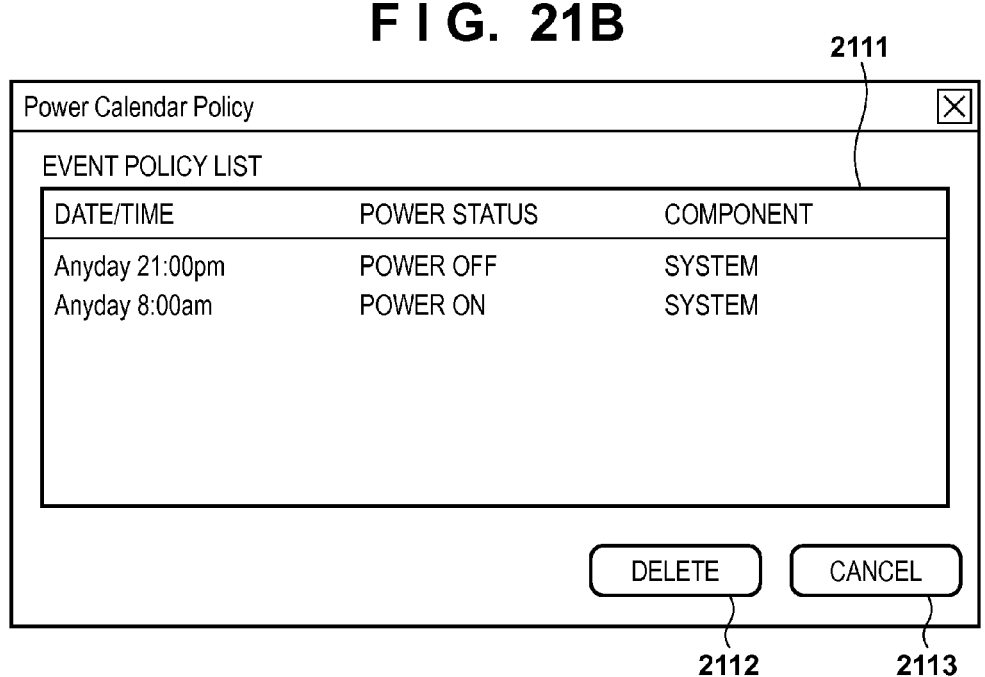

| Status ID | Status | Status ID | Recoverystatus |
|---|---|---|---|
| 10 | paper jam | 20 | paper jam recovery |
| 11 | operator call | 21 | operator call recovery |

| PowerStatus | POWER SAVING PRIORITY | CONTINUATION PRIORITY |
|---|---|---|
| on(20) | 5 | 1 |
| standby(30) | 4 | 2 |
| suspend(40) | 3 | 3 |
| offHard(60) | 1 | 5 |
| hibernate(70) | 2 | 4 |

| ID | Parent | Description |
|---|---|---|
| 0 |  | system |
| 1 | 0 | engine |
| 2 | 0 | controller |
| 3 | 0 | option |
| 4 | 1 | marker |
| 5 | 1 | drum |
| 6 | 2 | processor |
| 7 | 2 | storage |
| 8 | 2 | interface |
| 9 | 2 | NIC |
| 10 | 3 | scanner |
| 11 | 3 | fax |
| 12 | 3 | finisher |

2701, 2702, 2703

MANAGING APPARATUS, MANAGING METHOD, AND STORAGE MEDIUM STORING PROGRAM

BACKGROUND OF THE INVENTION

Field of the Invention

The present invention relates to a managing apparatus for managing the power status of a device, a managing method, and a storage medium storing a program.

Description of the Related Art

Defining rules of power control of a device according to the policy of power saving or the like is called a power management policy, a power supply management policy, or the like. Japanese Patent Laid-Open No. 2005-250960 describes a technique of managing power consumption of a device and the like by such a policy.

PWG (Printer Working Group) is known as one of the IEEE standardization working groups. In the power management field, the PWG defines, as an event policy, a rule to control power in a device in accordance with a status change (event) concerning whether a printing apparatus can print. As for the event policy, there is proposed a specification that finely defines a power status in stages, defines power control specific to a part in the device, and controls power for each part in the device in accordance with a status change concerning whether a printing apparatus can print. Also proposed is a specification about a rule (calendar policy) that controls a power status in accordance with a schedule.

When the event policy that is a rule to control the power status in accordance with a change in a device status and the calendar policy that is a rule to control the power status in accordance with a schedule are set, a conflict (mismatch) may occur between the policies. For example, a mismatch occurs between an event policy to power off a device in case of error occurrence and a calendar policy to power on the device at a certain time. Such a mismatch leads to an unexpected power status of the device.

SUMMARY OF THE INVENTION

An aspect of the present invention is to eliminate the above-mentioned problems with the conventional technology. The present invention provides a managing apparatus for appropriately preventing a mismatch in power control of a device, a managing method, and a storage medium storing a program.

The present invention in one aspect provides a managing apparatus for managing an image forming apparatus, comprising: a power control unit configured to control a power status of the image forming apparatus in accordance with a notification of event occurrence from the image forming apparatus; a determination unit configured to, upon receiving the notification from the image forming apparatus, determine whether a first power status of the image forming apparatus according to a schedule and a second power status of the image forming apparatus controlled by the power control unit based on the notification match each other; a selection unit configured to, in a case where the determination unit determines that the first power status and the second power status do not match, select one of the first power status and the second power status based on priority information representing which one of the first power status and the second power status is given priority; and a managing unit configured to prohibit control of the power status of the image forming apparatus by the power control unit in a case where the first power status is selected by the selection unit, and invalidate control of the power status of the image forming apparatus according to the schedule in a case where the second power status is selected by the selection unit.

According to the present invention, it is possible to appropriately prevent a mismatch in power control of a device.

Further features of the present invention will become apparent from the following description of exemplary embodiments with reference to the attached drawings.

BRIEF DESCRIPTION OF THE DRAWINGS

FIG. 6 is a flowchart showing processing when a status change has occurred in the printing apparatus;

FIG. 8 is a view showing a table managed by a device list managing unit;

FIGS. 9A to 9D are views showing event policy lists;

FIGS. 10A to 10D are views showing calendar policy lists;

FIGS. 11A and 11B are views showing conflict warning screens;

FIGS. 12A to 12C are views showing policy conflict lists;

FIG. 13 is a view showing a calendar policy invalidation list;

FIGS. 14A and 14B are views showing command formats of event policy addition;

FIGS. 15A and 15B are views showing command formats of calendar policy addition;

FIG. 16 is a view showing a command format of power status change request;

FIG. 18 is a view showing a status notification list;

FIG. 19 is a flowchart showing processing of deleting an event policy;

FIGS. 21A and 21B are views showing event policy deletion screens;

FIG. 26 is a view showing a priority order table;

FIG. 27 is a view showing the hierarchical structure of parts of a printing apparatus.

DESCRIPTION OF THE EMBODIMENTS

Figure 1:
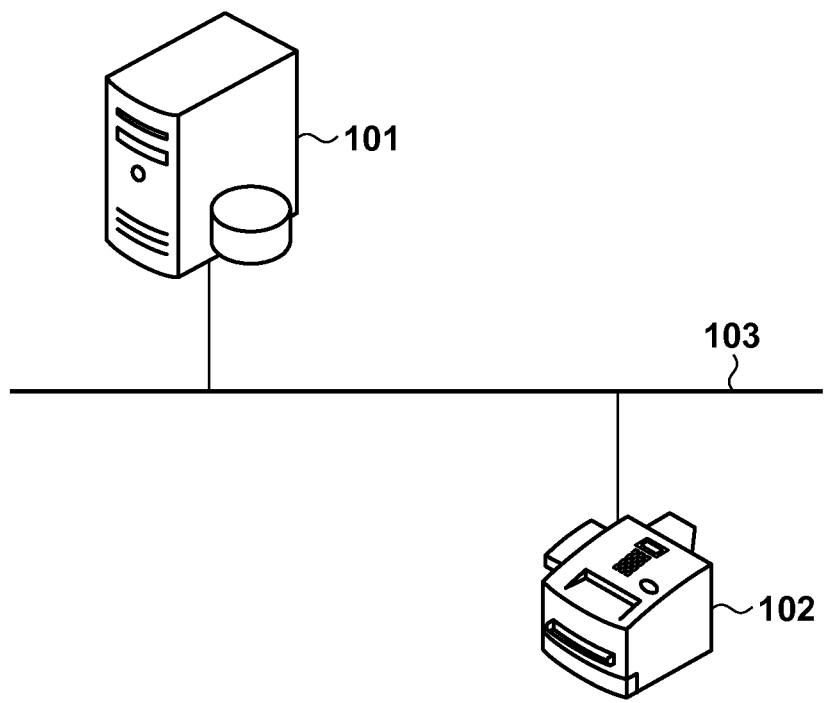
FIG. 1 is a view showing the overall arrangement of a system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same constituent elements, and a description thereof will be omitted.

[First Embodiment]

FIG. 1 is a view showing the overall arrangement of a system according to this embodiment. In this system, a managing apparatus 101 manages a printing apparatus 102 via a network 103 such as a LAN using a management protocol such as SNMP.

Figure 2:
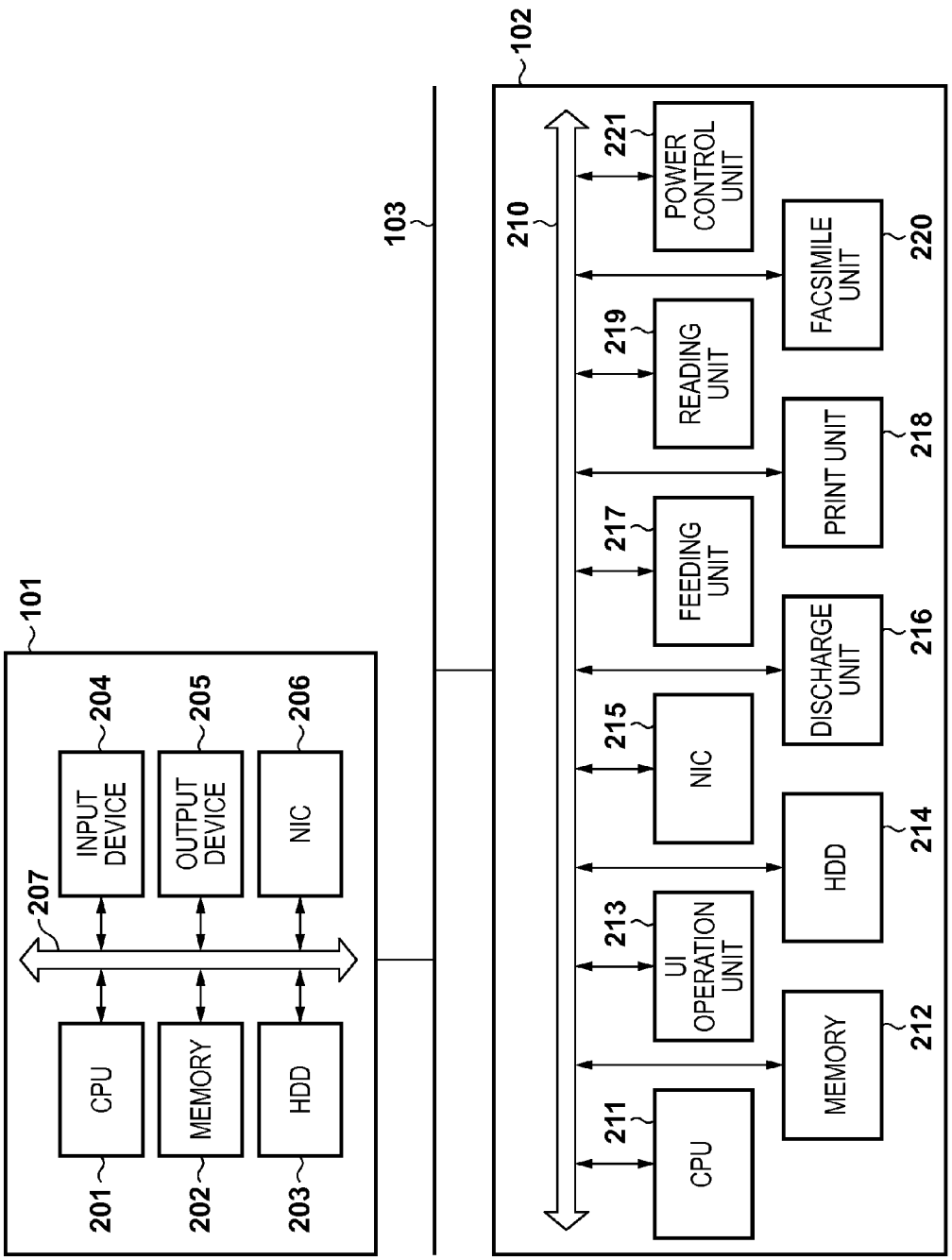
FIG. 2 is a block diagram showing the hardware arrangement of a managing apparatus and a printing apparatus.

FIG. 2 is a block diagram showing the hardware arrangement of the managing apparatus 101 and the printing apparatus 102. The managing apparatus 101 includes a CPU 201, a memory 202, a hard disk (HDD) 203, an input device 204, an output device 205, and a network control unit (NIC) 206. The CPU 201 to the NIC 206 are connected via a bus 207 so as to be communicable with each other. The HDD 203 stores programs and data. The CPU 201 loads the programs and data stored a storage area of the HDD 203 or the like to the memory 202 and executes them, thereby implementing the operation of this embodiment. The CPU 201 transmits display information of a user interface screen to the output device 205 which may be a display. The output device 205 displays the user interface screen based on the display information. The input device 204 receives (accepts) input information by a user operation and transmits the input information to the CPU 201. The network control unit (NIC) 206 connects the managing apparatus 101 to the network 103 and enables communication with an apparatus on the network 103.

The printing apparatus 102 includes a bus 210, a CPU 211, a memory 212, a user interface (UI) operation unit 213, a hard disk (HDD) 214, and a network control unit (NIC) 215. The printing apparatus 102 also includes a discharge unit 216, a feeding unit 217, a print unit 218, a reading unit (scan unit) 219, a facsimile unit 220, and a power control unit 221. In FIG. 2, the printing apparatus 102 represents an image forming apparatus that integrates a plurality of functions such as a print function and a scan function, that is, a so-called MFP (MultiFunctional Peripheral). In some cases, the printing apparatus 102 is not equipped with the reading unit 219 and the facsimile unit 220. The power control unit 221 performs power control to partially limit power supply to the parts of the printing apparatus 102, for example, the discharge unit 216 and the feeding unit 217 along with a transition to a sleep mode. The CPU 211 to the power control unit 221 are connected via the bus 210 so as to be communicable with each other. The CPU 211 loads programs stored a storage area of the HDD 214 or the like to the memory 212 and executes them, thereby implementing the operation of this embodiment.

The UI operation unit 213 displays various kinds of user interface screens on a display. The UI operation unit 213 receives input information by a user operation and transmits the input information to the CPU 211. The network control unit (NIC) 215 connects the printing apparatus 102 to the network 103 and enables communication with an apparatus on the network 103. The discharge unit 216 performs discharge processing of a printing medium such as printing paper. The feeding unit 217 performs supply processing of a printing medium to the print unit 218. The print unit 218 performs print processing by an inkjet or electrophotographic method. The reading unit 219 optically reads the image of an original placed on the original platen (not shown). The facsimile unit 220 performs facsimile transmission/reception processing.

Figure 3:
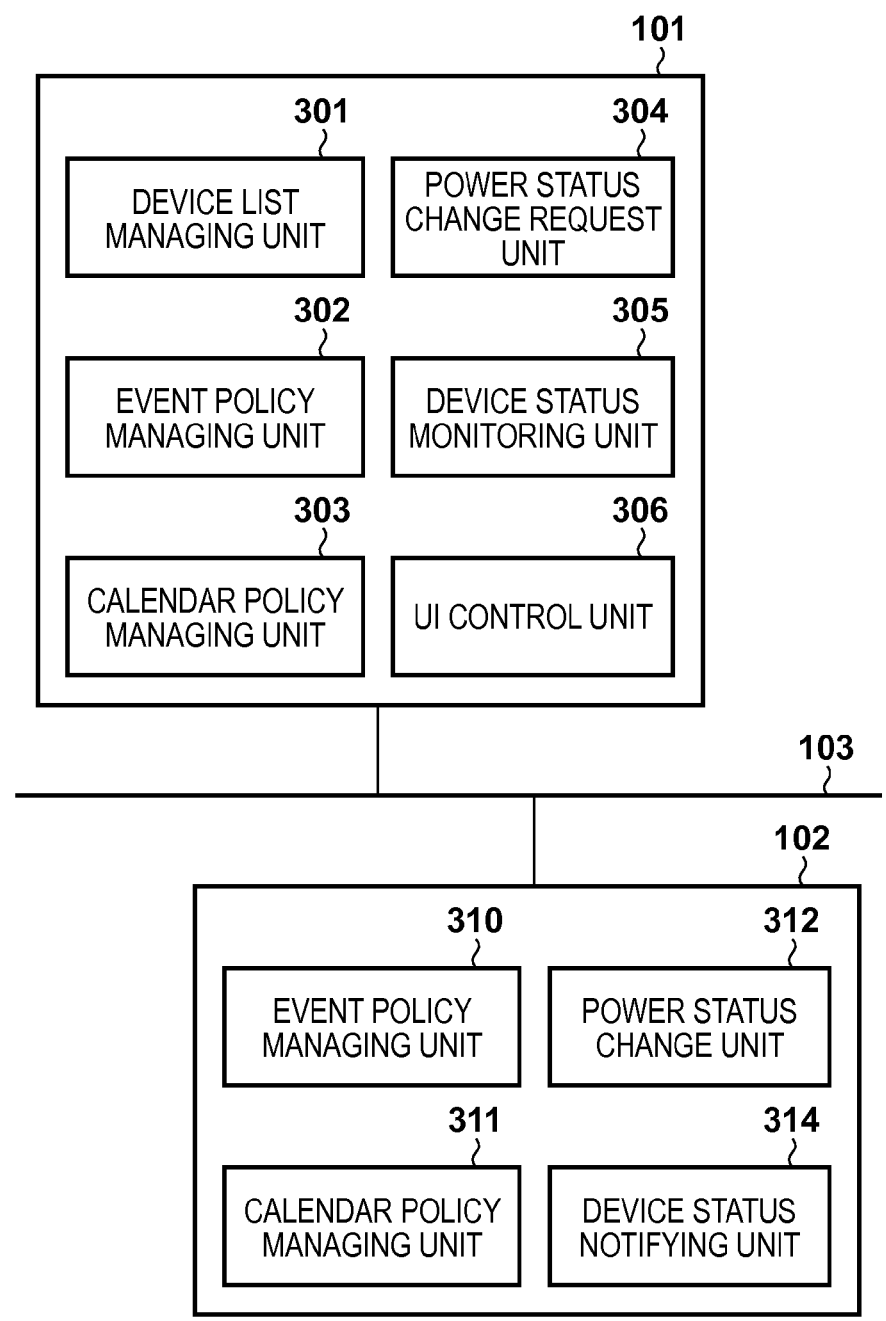
FIG. 3 is a block diagram showing the software arrangement of the managing apparatus and the printing apparatus.

FIG. 3 is a block diagram showing the software arrangement of the managing apparatus 101 and the printing apparatus 102. A device list managing unit 301 of the managing apparatus 101 manages a list of a plurality of printing apparatuses 102 of the management target in a table format. FIG. 8 is a view showing an example of the table managed by the device list managing unit 301. As shown in FIG. 8, the list of printing apparatuses includes a device ID 801 used to uniquely identify each printing apparatus 102, a device name 802, and an IP address 803.

An event policy managing unit 302 manages a list of event policies and requests the printing apparatus 102 to add or delete an event policy. The event policy is a rule that defines how to change the power status of a device when an event such as paper jam or toner out has occurred. For example, it is a rule that the print unit should be set in a power saving status when paper jam has occurred. FIG. 9A is a view showing an example of the table of the event policy list managed by the event policy managing unit 302. As shown in FIG. 9A, the event policy list includes an event ID 901 used to uniquely identify an event policy, and an event name 902 that clearly represents the contents of the event policy. The event policy list also includes a power status 903 of the printing apparatus 102 which changes upon event occurrence, and a part (component) 904 whose power status changes upon event occurrence. In this embodiment, the printing apparatus 102 also manages a list of event policies as shown in FIG. 9B (to be described later). The managing apparatus 101 can add/delete an event policy to/from the printing apparatus 102 using the SNMP protocol.

FIG. 14A is a view showing an example of the command format of the SNMP protocol for event policy addition from the managing apparatus 101 to the printing apparatus 102. A description 1401 shown in FIG. 14A represents a write request to the printing apparatus 102. A description 1402 represents a part of the printing apparatus 102 to which the event policy is applied. A description 1403 represents the power status after a transition by the event policy. A description 1404 represents the event policy name. A description 1405 represents that the event policy is to be added to the printing apparatus 102. FIG. 14B is a view showing an example of the command format of the SNMP protocol for event policy deletion from the managing apparatus 101 to the printing apparatus 102. FIG. 14B is different from FIG. 14A in that a description 1411 represents deletion of an event policy from the printing apparatus 102.

The event policy managing unit 302 checks a conflict (that is, mismatch status) between an event policy and a calendar policy. The calendar policy is a rule that defines how to change the power status of a device at a periodical timing (schedule). For example, it is a rule that the device should be powered off at 18:00 every day.

If an event policy and a calendar policy are managed in a single device, the conditions may conflict with each other. For example, an event policy that powers off a device at the time of event occurrence and a calendar policy that powers on the device at a predetermined time do not match because of different power statuses. If a conflict with the calendar policy exists, the event policy managing unit 302 transmits, to a UI control unit 306, display information to warn about the conflict.

A calendar policy managing unit 303 manages a list of calendar policies. FIG. 10A is a view showing an example of the table of the calendar policy list managed by the calendar policy managing unit 303. As shown in FIG. 10A, the calendar policy list includes a calendar ID 1001 used to uniquely identify a calendar, and a power status transition start time 1002 based on the calendar. The calendar policy list also includes a power status 1003 requested for the printing apparatus 102, and a component 1004 represents a part whose power status is to be transited. In this embodiment, the printing apparatus 102 also manages a list of calendar policies as shown in FIG. 10B (to be described later). The managing apparatus 101 can add/delete a calendar policy to/from the printing apparatus 102 using the SNMP protocol.

FIG. 15A is a view showing an example of the command format of the SNMP protocol for calendar policy addition from the managing apparatus 101 to the printing apparatus 102. A description 1501 shown in FIG. 15A represents a write request to the printing apparatus 102. A description 1502 represents a part of the printing apparatus 102 to which the calendar policy is applied. A description 1503 represents the power status after a transition by the calendar policy. Each of descriptions 1504, 1505, and 1506 represents a calendar policy start time. A description 1507 represents that the calendar policy is to be added to the printing apparatus 102. FIG. 15B is a view showing an example of the command format of the SNMP protocol for calendar policy deletion from the managing apparatus 101 to the printing apparatus 102. FIG. 15B is different from FIG. 15A in that a description 1511 represents deletion of a calendar policy from the printing apparatus 102.

The calendar policy managing unit 303 checks a conflict between a calendar policy and an event policy. If a conflict exists, the calendar policy managing unit 303 transmits, to the UI control unit 306, display information to warn about the conflict. A power status change request unit 304 requests the printing apparatus 102 to change the power status. The power status change request is done by a protocol such as SNMP.

FIG. 16 is a view showing an example of the command format of the SNMP protocol for the power status change request from the managing apparatus 101 to the printing apparatus 102. A description 1601 shown in FIG. 16 represents a power status change request. A description 1602 represents a part of the printing apparatus 102 to which the power status change request is applied. A description 1603 represents what kind of power status is requested by the change request.

A device status monitoring unit 305 of the managing apparatus 101 requests the printing apparatus 102 to register specific status information. Here, the status information means information used to identify an event occurrence status that needs a change in the power status of the printing apparatus 102, for example, information used to identify a paper jam status. In this embodiment, the managing apparatus 101 requests the printing apparatus 102 to register specific status information, and the printing apparatus 102 thus notifies the managing apparatus 101 of a specific event when it has occurred.

Figure 17A:
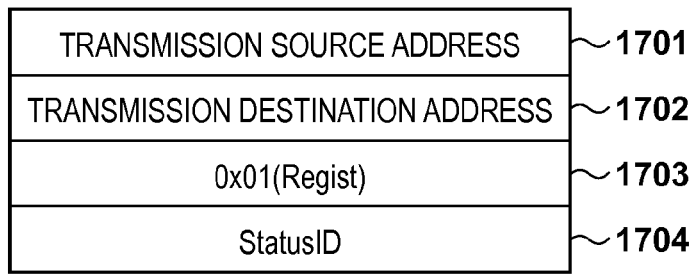
FIGS. 17A to 17D are views showing command formats of status information registration request.

FIG. 17A is a view showing an example of the command format of the status information registration request from the managing apparatus 101 to the printing apparatus 102. A description 1701 shown in FIG. 17A represents a transmission source address, and in this embodiment, represents the IP address of the managing apparatus 101. A description 1702 represents a transmission destination address, and in this embodiment, represents the IP address of the printing apparatus 102. A description 1703 represents a registration request. A description 1704 represents a status ID used to uniquely identify the status information requested to be registered.

The device status monitoring unit 305 also requests the printing apparatus 102 to delete status information. FIG. 17C is a view showing an example of the command format of the status information deletion request from the managing apparatus 101 to the printing apparatus 102. A description 1721 shown in FIG. 17C represents a transmission source address, and in this embodiment, represents the IP address of the managing apparatus 101. A description 1722 represents a transmission destination address, and in this embodiment, represents the IP address of the printing apparatus 102. A description 1723 represents a deletion request. A description 1724 represents a status ID used to uniquely identify the status information requested to be deleted.

The device status monitoring unit 305 also receives the status information of the printing apparatus 102 from the printing apparatus 102. For example, the device status monitoring unit 305 requests the printing apparatus 102 to notify status information at a timing designated in advance, thereby acquiring the status information of the printing apparatus 102. FIG. 17D is a view showing an example of the command format of the status information notification request from the managing apparatus 101 to the printing apparatus 102. A description 1731 shown in FIG. 17D represents a transmission source address, and in this embodiment, represents the IP address of the managing apparatus 101. A description 1732 represents a transmission destination address, and in this embodiment, represents the IP address of the printing apparatus 102. A description 1733 represents a notification request.

Figure 17B:
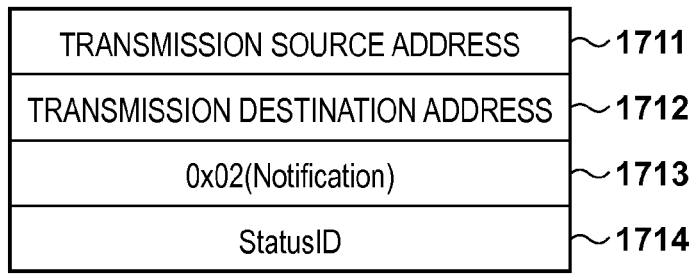
Figure 17C:
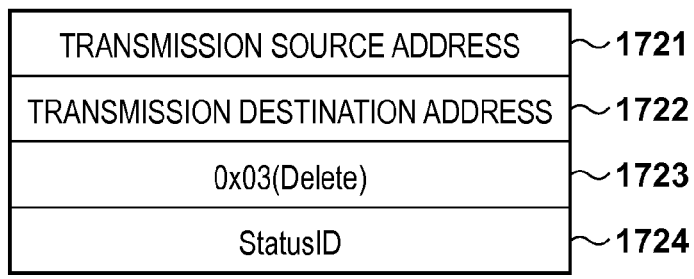
Figure 17D:
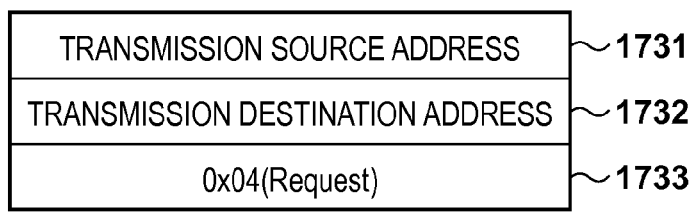

Upon receiving the notification request shown in FIG. 17D from the managing apparatus 101, a device status notifying unit 314 of the printing apparatus 102 transmits the status information of the printing apparatus 102 using a command format shown in FIG. 17B. A description 1711 shown in FIG. 17B represents a transmission source address, and in this embodiment, represents the IP address of the printing apparatus 102. A description 1712 represents a transmission destination address, and in this embodiment, represents the IP address of the managing apparatus 101. A description 1713 represents a status information notification. A description 1714 represents a status ID used to uniquely identify the status information as the notification target.

The UI control unit 306 of the managing apparatus 101 generates the display data of the user interface screen to be displayed on the output device 205 based on the display information transmitted from the CPU 201.

An event policy managing unit 310 of the printing apparatus 102 receives an event policy registration or deletion request from the managing apparatus 101 and controls the event policy list of the printing apparatus 102. The event policy list of the printing apparatus 102 is, for example, a table shown in FIG. 9B. As shown in FIG. 9B, the event policy list includes an event ID 911 used to uniquely identify an event policy, and an event name 912 that clearly represents the contents of the event policy. The event policy list also includes a power status 913 of the printing apparatus 102 which changes upon event occurrence, and a part (component) 914 whose power status changes upon event occurrence.

The event policy managing unit 310 monitors the status change of the device, and if the status of the device has changed, determines whether the power status 913 to be changed which corresponds to the event ID 911 and the event name 912 on the event policy list shown in FIG. 9B exists. Upon determining that the power status to be changed exists, the event policy managing unit 310 requests a power status change unit 312 to change the power status of the corresponding part. For example, if paper jam has occurred during monitoring of the status change of the device, it is determined that there exists the power status 913 "standby" to be changed which corresponds to the event ID 911 "10" and the event name 912 "paper jam" shown in FIG. 9B. The event policy managing unit 310 requests the power status change unit 312 to change the power status of the corresponding part (for example, change to standby).

A calendar policy managing unit 311 receives a calendar policy registration or deletion request from the managing apparatus 101 and controls the calendar policy list of the printing apparatus 102. The calendar policy list of the printing apparatus 102 is, for example, a table shown in FIG. 10B. As shown in FIG. 10B, the calendar policy list includes a calendar ID 1011 used to uniquely identify a calendar, and a power status transition start time 1012 based on the calendar. The calendar policy list also includes a power status 1013 after a change, and a part (component) 1014 whose power status is to be transited.

The calendar policy managing unit 311 has a time managing function, and every time a predetermined time has elapsed, determines whether a corresponding power status to be changed exists on the calendar policy list. Upon determining that a power status to be changed exists, the calendar policy managing unit 311 requests the power status change unit 312 to change the power status of the corresponding part.

The power status change unit 312 receives a power status change request from the power status change request unit 304 of the managing apparatus 101 or the event policy managing unit 310 or calendar policy managing unit 311 of the printing apparatus 102. Based on each change request, the power status change unit 312 changes the corresponding part to the requested power status via the power control unit 221 of the printing apparatus 102.

The device status notifying unit 314 registers, in a status notification list shown in FIG. 18 as an example, the status described in the status registration request shown in FIG. 17A which is received from the device status monitoring unit 305 of the managing apparatus 101. As shown in FIG. 18, the status notification list includes a notification ID 1801 used to uniquely identify notification contents, an IP address 1802 of the notification destination (managing apparatus 101 in this embodiment), and a status ID 1803. Note that the status ID 1803 stores the same value as the event IDs 901 and 911 on the event policy lists shown in FIGS. 9A and 9B.

In addition, based on the status deletion request shown in FIG. 17C which is received from the device status monitoring unit 305 of the managing apparatus 101, the device status notifying unit 314 deletes information about the corresponding status from the status notification list shown in FIG. 18. The device status notifying unit 314 also monitors the status of the printing apparatus 102, and if the status has changed to the status described in the status ID 1803 shown in FIG. 18, notifies the notification destination IP address 1802 to the status of the printing apparatus 102 using the status notification command shown in FIG. 17B. For example, if jam has occurred in the printing apparatus 102, the managing apparatus 101 is notified of the occurrence of the jam.

Figure 4:
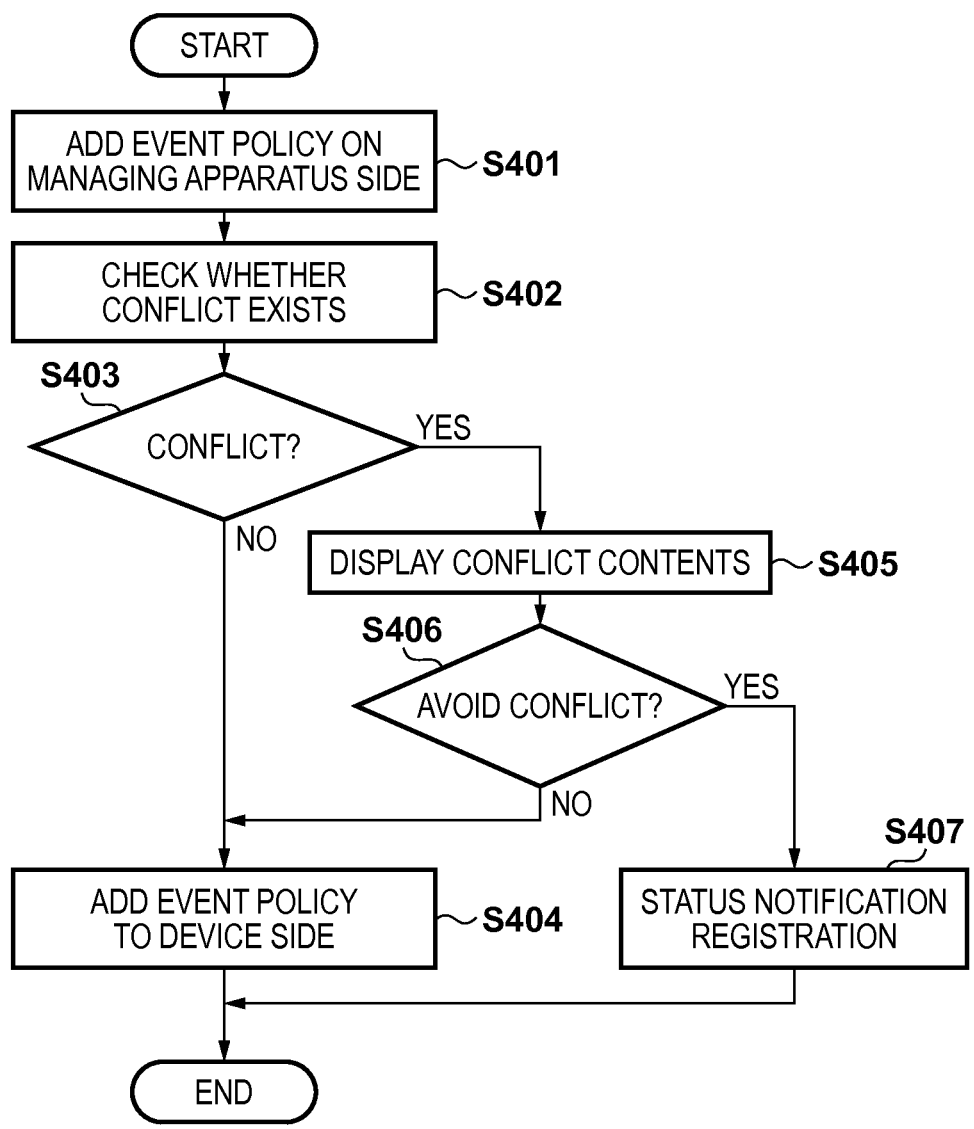
FIG. 4 is a flowchart showing processing of adding an event policy.

FIG. 4 is a flowchart showing the procedure of processing of adding an event policy to the event policy list shown in FIG. 9A by the managing apparatus 101. Upon receiving an event policy addition instruction, the UI control unit 306 of the managing apparatus 101 displays an event policy addition screen shown in FIG. 7A on the output device 205. In an event policy addition screen 701 shown in FIG. 7A, selection of an event from the user is received on a device status list 702. In correspondence with the selected event, selection of a power status after a change is received on a power status list 704. In addition, selection of a part whose power status is to be changed is received on a part list 703.

Figure 7A:
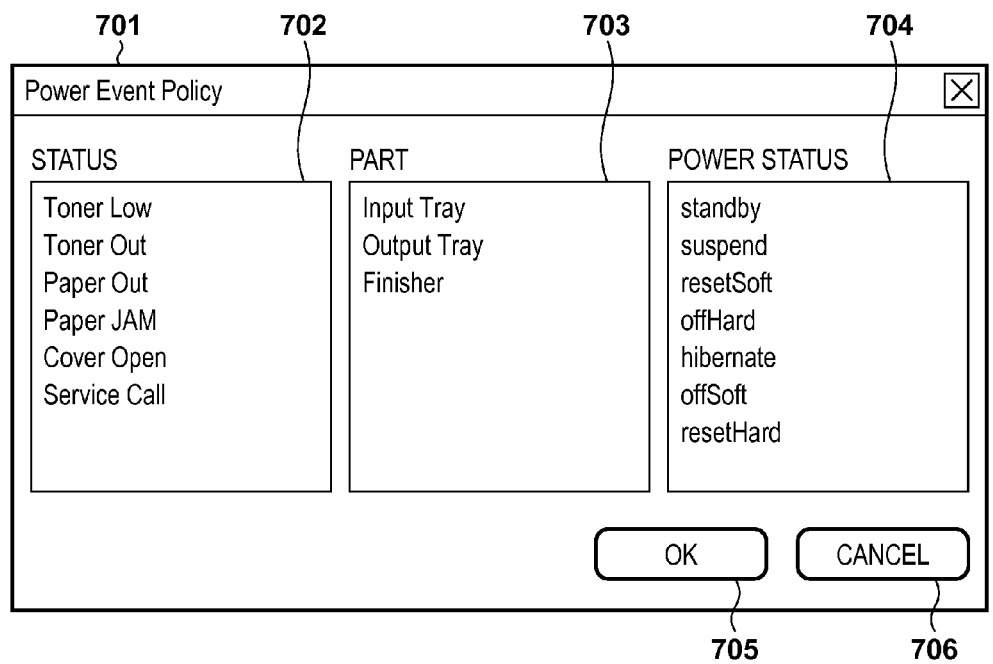
FIGS. 7A and 7B are views showing event policy addition screens.

In step S401, an event, a power status, and a part necessary for event registration are selected on the event policy addition screen shown in FIG. 7A, and the event policy managing unit 302 detects the press of an OK button 705. The event policy managing unit 302 adds the event policy to the event policy list shown in FIG. 9A.

In step S402, the event policy managing unit 302 searches the calendar policy list shown in FIG. 10A for a calendar policy having a power status different from the power status set in the added event policy. That is, the event policy managing unit 302 checks whether a conflict exists concerning the added event policy. In step S403, the event policy managing unit 302 determines whether there exists a calendar policy that conflicts with the added event policy.

In the determination of step S403, the event policy managing unit 302 refers to the hierarchical structure of the parts of the printing apparatuses 102 shown in FIG. 27, and determines whether the parts are identical in case of conflict. For example, assume that the part corresponding to the event policy is "SYSTEM", and the part corresponding to the calendar policy is "ENGINE" in case of conflict. In this case, according to FIG. 27, a parent ID 2702 of a part 2703 "ENGINE" is 0, and an ID 2701 of the part 2703 "SYSTEM" is 0. Hence, "ENGINE" is included in "SYSTEM", as can be seen. That is, a conflict exists concerning at least the part "ENGINE", as is apparent.

Upon determining in step S403 that there exists no conflicting calendar policy, the event policy managing unit 302 sends an event policy addition request to the printing apparatus 102 using the command shown in FIG. 14A in step S404. Upon determining in step S403 that there exists a conflicting calendar policy, the event policy managing unit 302 requests the UI control unit 306 to display a conflict warning screen shown in FIG. 11A in step S405. The UI control unit 306 displays the conflict warning screen shown in FIG. 11A.

In FIG. 11A, as calendar policies that conflict (have different power statuses) with, for example, an event policy "change to PowerOff in case of paper jam", "set PowerOn at 9:00 every day" and "set sleep at 12:00 every day" are displayed. To preferentially set one of the calendar policies, the user checks a corresponding button 1101.

If the UI control unit 306 detects the press of a cancel button 1103 in step S406, the process advances to step S404. If the UI control unit 306 detects designation of the priority relationship between the event policy and the calendar policy (chuck of the button 1101) and reception of an OK button 1102, the process advances to step S407.

In step S407, the event policy managing unit 302 adds the calendar policy conflicting with the event policy to the policy conflict list shown in FIG. 12A. As shown in FIG. 12A, the policy conflict list includes an ID 1201 that uniquely represents a conflict status, an event policy ID 1202, a corresponding calendar policy ID 1203, and priority information 1204 representing which one of the event policy and the calendar policy should be given priority. The priority information 1204 is based on the information received in FIG. 11A.

In step S407, the device status monitoring unit 305 sends the device status registration request shown in FIG. 17A to the printing apparatus 102. Upon receiving the registration request, the device status notifying unit 314 of the printing apparatus 102 adds the status ID 1803 and the notification destination IP address 1802 having the same contents as the event policy ID 1202 to the status notification list shown in FIG. 18.

As described above, when adding an event policy, the event policy is added to the event policy list managed by the managing apparatus 101, and it is also checked whether there exists a calendar policy that conflicts with the event policy. If a conflicting calendar policy exists, a screen that allows the user to select one of the event policy and the calendar policy to which priority should be given is displayed, and a user designation is received. If the added event policy conflicts with a calendar policy, the printing apparatus 102 is notified of the event ID of the event policy and requested to register it in the status notification list. In this arrangement, if the event (for example, paper jam) has occurred in the printing apparatus 102, the managing apparatus 101 is notified of it without transition of the power status. Based on the priority relationship with the calendar that conflicts with the notified event, the managing apparatus 101 instructs the printing apparatus 102 how to transit the power status. If the event policy to be added does not conflict with any calendar policy, the event policy is added to the event policy list managed by the printing apparatus 102, as in the managing apparatus 101.

Figure 5:
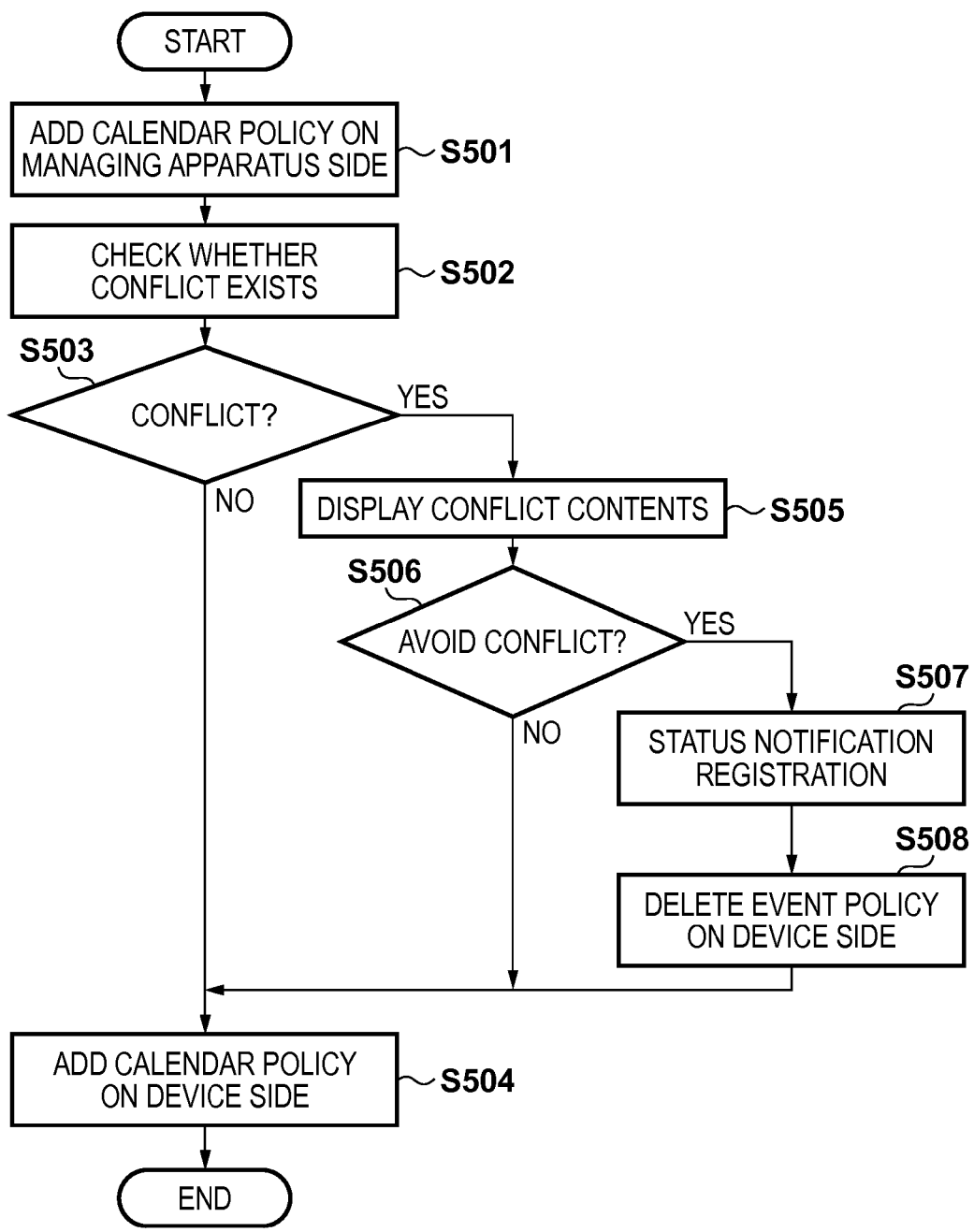
FIG. 5 is a flowchart showing processing of adding a calendar policy.

FIG. 5 is a flowchart showing the procedure of processing of adding a calendar policy to the calendar policy list shown in FIG. 10A by the managing apparatus 101. Upon receiving a calendar policy addition instruction, the UI control unit 306 of the managing apparatus 101 displays a calendar policy addition screen shown in FIG. 7B on the output device 205. In a calendar policy addition screen 711 shown in FIG. 7B, date/time selection is received on a power status change start date/time 712. In addition, selection of a part whose power status is to be changed is received on a part list 713. Furthermore, selection of a power status after the change is received on a power status list 714.

Figure 7B:
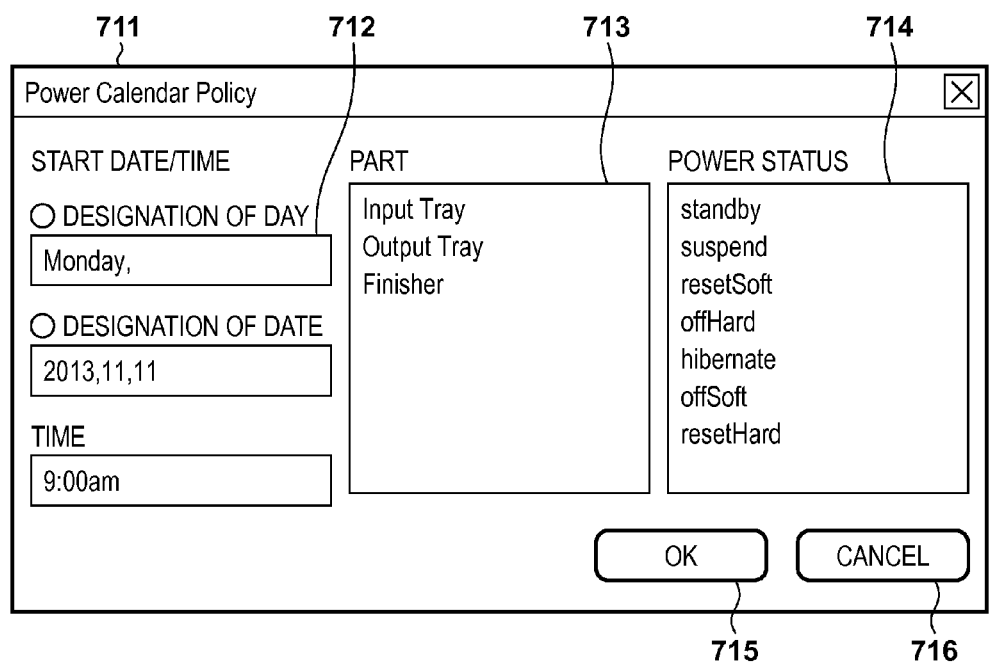

In step S501, when a date/time, a power status, and a part are selected on the calendar policy addition screen shown in FIG. 7B, and the press of an OK button 715 is detected, the calendar policy managing unit 303 adds the calendar policy to the calendar policy list shown in FIG. 10A.

In step S502, the calendar policy managing unit 303 searches the event policy list shown in FIG. 9A for an event policy having a power status different from the power status set in the added calendar policy. That is, the calendar policy managing unit 303 checks whether a conflict exists concerning the added calendar policy. In step S503, the calendar policy managing unit 303 determines whether there exists an event policy that conflicts with the added calendar policy.

In the determination of step S503, the calendar policy managing unit 303 refers to the hierarchical structure of the parts of the printing apparatuses 102 shown in FIG. 27, and confirms whether the parts are identical in case of conflict. For example, assume that the part corresponding to the event policy is "SYSTEM", and the part corresponding to the calendar policy is "ENGINE" in case of conflict. In this case, according to FIG. 27, the parent ID 2702 of the part 2703 "ENGINE" is 0, and the ID 2701 of the part 2703 "SYSTEM" is 0. Hence, "ENGINE" is included in "SYSTEM", as can be seen. That is, a conflict exists concerning at least the part "ENGINE", as is apparent.

Upon determining in step S503 that there exists no conflicting event policy, the calendar policy managing unit 303 sends a calendar policy addition request to the printing apparatus 102 using the command shown in FIG. 15A in step S504. Upon determining in step S503 that there exists a conflicting event policy, the calendar policy managing unit 303 requests the UI control unit 306 to display a conflict warning screen shown in FIG. 11B in step S505. The UI control unit 306 displays the conflict warning screen shown in FIG. 11B.

In FIG. 11B, as event policies that conflict (have different power statuses) with, for example, a calendar policy "set PowerOn at 9:00 every day", "change to PowerOff in case of paper jam" and "change to sleep in case of paper out" are displayed. To preferentially set one of the event policies, the user checks a corresponding button 1111.

If the UI control unit 306 detects the press of a cancel button 1113 in step S506, the process advances to step S504. If the UI control unit 306 detects designation of the priority relationship between the calendar policy and the event policy (chuck of the button 1111) and reception of an OK button 1112, the process advances to step S507.

In step S507, the calendar policy managing unit 303 adds the event policy conflicting with the calendar policy to the policy conflict list shown in FIG. 12A. In step S507, the device status monitoring unit 305 sends the device status registration request shown in FIG. 17A to the printing apparatus 102. Upon receiving the registration request, the device status notifying unit 314 of the printing apparatus 102 adds the status ID 1803 and the notification destination IP address 1802 having the same contents as the event policy ID 1202 to the status notification list shown in FIG. 18.

In step S508, the event policy managing unit 302 sends the conflicting event policy deletion request to the printing apparatus 102 using the command shown in FIG. 14B. After step S508, the process of step S504 is performed.

As described above, when adding a calendar policy, the calendar policy is added to the calendar policy list managed by the managing apparatus 101 and the printing apparatus 102, and it is also checked whether there exists an event policy that conflicts with the calendar policy. If a conflicting event policy exists, a screen that allows the user to select one of the calendar policy and the event policy to which priority should be given is displayed, and a user designation is received. If the added calendar policy conflicts with an event policy, the printing apparatus 102 is notified of the event ID of the event policy and requested to register it in the status notification list. In this arrangement, if the event (for example, paper jam) has occurred in the printing apparatus 102, the managing apparatus 101 is notified of it without transition of the power status. Based on the priority relationship with the calendar that conflicts with the notified event, the managing apparatus 101 instructs the printing apparatus 102 how to transit the power status.

FIG. 6 is a flowchart showing the procedure of processing of the managing apparatus 101 and the printing apparatus 102 when a status change has occurred in the printing apparatus 102. If a status (event) such as paper jam or toner out occurs in the printing apparatus 102, the device status notifying unit 314 of the printing apparatus 102 confirms whether a status ID corresponding to the event that has occurred exists in the status ID 1803 of the status notification list shown in FIG. 18. As already described, a status ID corresponds to an event ID. If a status ID corresponding to the event that has occurred exists, the device status notifying unit 314 notifies the status information, that is, the status ID to the IP address 1802 of the notification destination using the command shown in FIG. 17B.

In step S601, the device status monitoring unit 305 of the managing apparatus 101 receives status information from the printing apparatus 102. In step S602, the event policy managing unit 302 acquires the event ID 901 in the event policy list shown in FIG. 9A, which corresponds to the status information received from the printing apparatus 102. In step S603, the event policy managing unit 302 determines whether the event ID 901 acquired in step S602 exists in the policy conflict list shown in FIG. 12A. Upon determining that the event ID does not exist in the policy conflict list shown in FIG. 12A, the process advances to step S611. Upon determining that the event ID exists in the policy conflict list shown in FIG. 12A, the process advances to step S604. In step S611, the power status change request unit 304 requests the printing apparatus 102 to change the power status in accordance with the event policy corresponding to the event ID acquired in step S602.

Figures 22, 23:
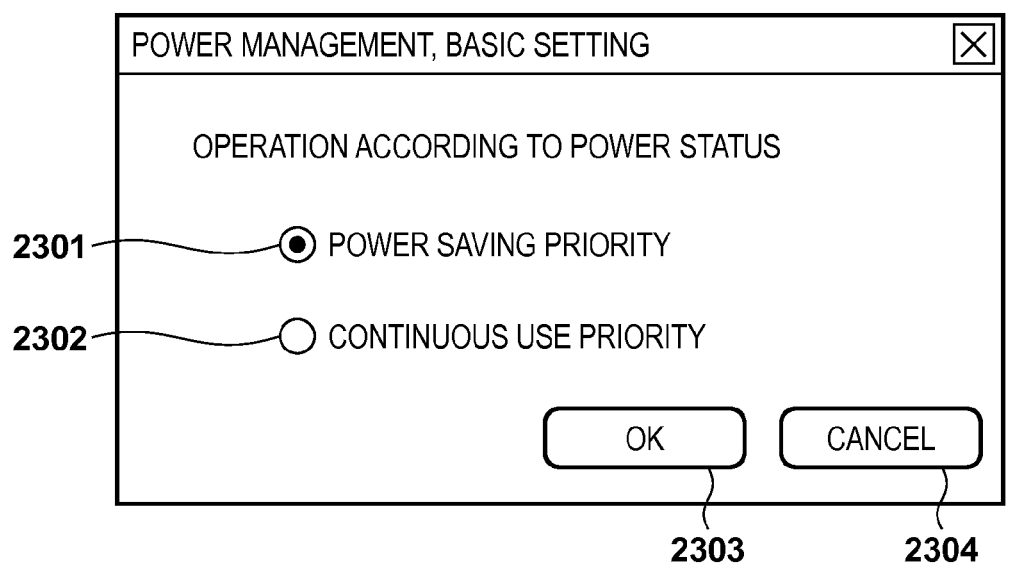
FIG. 22 is a view showing a recovery status correspondence list.
FIG. 23 is a view showing a basic policy setting screen.

In step S604, the device status monitoring unit 305 acquires a recovery status correspondence list shown in FIG. 22. The recovery status correspondence list shown in FIG. 22 represents whether the status notified from the printing apparatus 102 is a recovery status (recovery event) corresponding to a status notified before. As shown in FIG. 22, the recovery status correspondence list includes a status ID 2203 representing a recovery status and a status name 2204 representing a recovery status in correspondence with a status ID 2201 and a status name 2202. For example, the status ID 2203 and the status name 2204 representing that paper jam is recovered are specified in correspondence with the status ID 2201 and the status name 2202 of paper jam. The recovery status correspondence list shown in FIG. 22 is, for example, created by the user in advance. In step S604, the device status monitoring unit 305 also determines whether the event ID acquired in step S602 exists in the status ID 2203 and status name 2204 representing the recovery status of the acquired recovery status correspondence list shown in FIG. 22. Upon determining that the event ID does not exist, the process advances to step S608. Upon determining that the event ID exists, the process advances to step S605.

The processing of steps S601 to S603 (No) in FIG. 6 corresponds to a case where, for example, the event that has occurred in the printing apparatus 102 and been notified to the managing apparatus 101 neither is a recovery event nor conflicts with the calendar policy. In this case, power control of the printing apparatus 102 is performed in accordance with the event policy.

In step S605, the calendar policy managing unit 303 acquires a calendar policy invalidation list shown in FIG. 13. In step S606, the calendar policy managing unit 303 determines whether the event ID acquired in step S602 exists in an event ID 1302 corresponding to a calendar ID 1301 of the calendar policy invalidation list shown in FIG. 13. Upon determining that the event ID does not exist, the processing of FIG. 6 ends. Upon determining that the event ID exists, the process advances to step S607. In step S607, the calendar policy managing unit 303 instructs the printing apparatus 102 to validate the calendar policy set to "invalidated" in the calendar policy invalidation list.

The processing of steps S601 to S603 (Yes) to step S604 (Yes) to steps S606 (Yes) and S607 in FIG. 6 corresponds to a case where the recovery event that has occurred in the printing apparatus 102 does not conflict with the calendar policy. In this case, jam or the like that has occurred in the printing apparatus 102 is canceled. Hence, if the calendar policy is set to "invalidated" in correspondence with the event policy, the invalidation is canceled to make the calendar policy executable. In step S607, the calendar policy managing unit 303 validates the calendar policy by deleting it from the calendar policy invalidation list shown in FIG. 13 which is managed by the managing apparatus 101.

In step S608, the device status monitoring unit 305 acquires, from the policy conflict list shown in FIG. 12A, a calendar ID corresponding to the event ID acquired in step S602. Additionally, in step S608, the calendar policy managing unit 303 determines, based on the priority information 1204 of the policy conflict list shown in FIG. 12A, whether priority is given to the calendar policy. Upon determining that no priority is given to the calendar policy, the process advances to step S609. Upon determining that priority is given to the calendar policy, the processing of FIG. 6 ends.

Note that which one of the event policy and the calendar policy should be given priority may be determined using time information. For example, it is determined whether the current time falls within the range of the set time of the calendar policy. Upon determining that the current time falls within the range of the set time of the calendar policy, the priority is given to the calendar policy. Upon determining that the current time falls outside the range of the set time of the calendar policy, the priority is given to the event policy.

The processing of steps S601 to S603 (Yes) to step S604 (No) to step S608 (Yes) in FIG. 6 corresponds to a case where the event that has occurred in the printing apparatus 102 and been notified to the managing apparatus 101 conflicts with the calendar policy, and the priority is given to the calendar policy. In this case, power control of the printing apparatus 102 is performed in accordance with the calendar policy.

In step S609, concerning the calendar policy corresponding to the event ID acquired in step S602 in the policy conflict list shown in FIG. 12A, the printing apparatus 102 is instructed to delete (invalidate) the calendar policy. In step S610, the power status change request unit 304 requests the printing apparatus 102 to change the power status in accordance with the event policy corresponding to the event ID accrued in step S602.

The processing of steps S601 to S603 (Yes) to step S604 (No) to step S608 (No) to step S610 in FIG. 6 corresponds to a case where the event that has occurred in the printing apparatus 102 and been notified to the managing apparatus 101 conflicts with the calendar policy, and the priority is given to the event policy. In this case, power control of the printing apparatus 102 is performed in accordance with the event policy.

FIG. 19 is a flowchart showing the procedure of processing of deleting an event policy from the event policy list shown in FIG. 9A by the managing apparatus 101. Upon receiving an event policy deletion request, the UI control unit 306 of the managing apparatus 101 displays an event policy deletion screen shown in FIG. 21A on the output device 205. An event policy deletion screen 2101 shown in FIG. 21A displays the contents acquired from the event policy list shown in FIG. 9A and receives selection of a deletion target event from the user.

In step S1901, when an event is selected on the event policy deletion screen 2101, and the press of a delete button 2102 is detected, the event policy managing unit 302 deletes the selected deletion target event policy from the event policy list shown in FIG. 9A.

In step S1902, the event policy managing unit 302 searches the policy conflict list shown in FIG. 12A for the deletion target event policy selected in step S1901. In step S1903, the event policy managing unit 302 determines whether the selected deletion target event policy is found in the search of step S1902. Upon determining that the selected deletion target event policy is not found, the process advances to step S1904. Upon determining that the selected deletion target event policy is found, the process advances to step S1905.

In step S1904, the event policy managing unit 302 transmits, to the printing apparatus 102, an instruction to delete the selected deletion target event policy from the event policy list shown in FIG. 9B. On the other hand, in step S1905, the device status monitoring unit 305 transmits, to the printing apparatus 102, an instruction to delete a row corresponding to the status ID 1803 of the status notification list shown in FIG. 18, which corresponds to the selected deletion target event policy.

In step S1906, the calendar policy managing unit 303 determines whether the event ID 1302 corresponding to the selected deletion target event policy exists in the calendar policy invalidation list shown in FIG. 13. Upon determining that the event ID exists, the process advances to step S1907. Upon determining that the event ID does not exist, the processing of FIG. 19 ends. In step S1907, the calendar policy managing unit 303 deletes the calendar policy corresponding to the selected deletion target event policy from the calendar policy invalidation list shown in FIG. 13, thereby avoiding invalidation. The calendar policy managing unit 303 transmits, to the printing apparatus 102, an instruction to validate the calendar policy. The calendar policy may be validated by adding the calendar policy.

Figure 20:
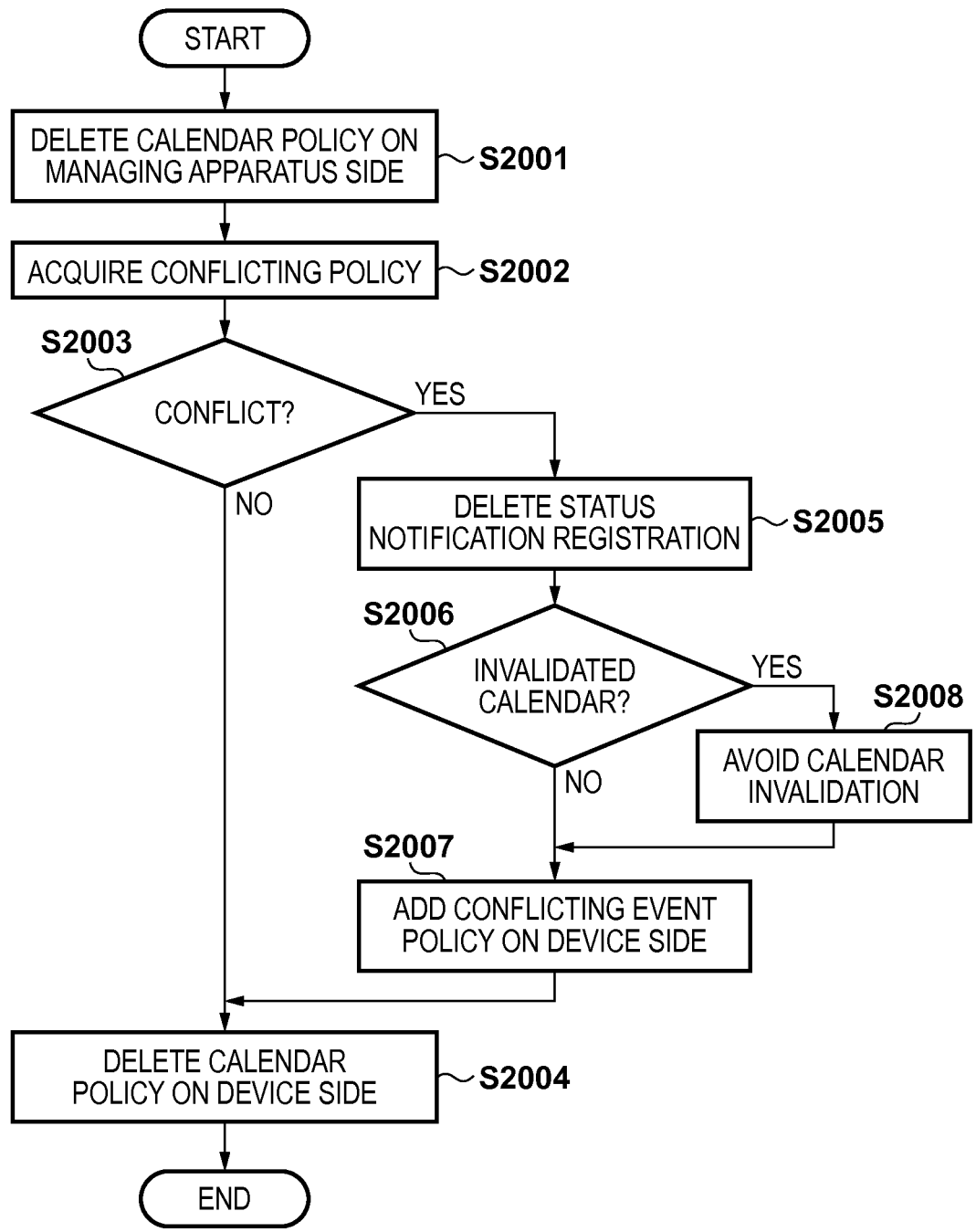
FIG. 20 is a flowchart showing processing of deleting a calendar policy.

FIG. 20 is a flowchart showing the procedure of processing of deleting a calendar policy from the calendar policy list shown in FIG. 10A by the managing apparatus 101. Upon receiving a calendar policy deletion request, the UI control unit 306 of the managing apparatus 101 displays a calendar policy deletion screen shown in FIG. 21B on the output device 205. A calendar policy deletion screen 2111 shown in FIG. 21B displays the contents acquired from the calendar policy list shown in FIG. 10A and receives selection of a deletion target calendar from the user.

In step S2001, when a calendar is selected on the calendar policy deletion screen 2111, and the press of a delete button 2112 is detected, the calendar policy managing unit 303 deletes the selected calendar policy from the calendar policy list shown in FIG. 10A.

In step S2002, the calendar policy managing unit 303 searches the policy conflict list shown in FIG. 12A for the deletion target calendar policy selected in step S2001. In step S2003, the calendar policy managing unit 303 determines whether the selected deletion target calendar policy is found in the search of step S2002. Upon determining that the selected deletion target calendar policy is not found, the process advances to step S2004. Upon determining that the selected deletion target calendar policy is found, the process advances to step S2005.

In step S2004, the calendar policy managing unit 303 transmits, to the printing apparatus 102, an instruction to delete the selected deletion target calendar policy from the calendar policy list shown in FIG. 10B. On the other hand, in step S2005, the calendar policy managing unit 303 acquires an event policy corresponding to the selected deletion target calendar policy from the policy conflict list shown in FIG. 12A. The device status monitoring unit 305 transmits, to the printing apparatus 102, an instruction to delete a row corresponding to the status ID 1803 of the status notification list shown in FIG. 18, which corresponds to the selected deletion target calendar policy. In step S2006, the calendar policy managing unit 303 determines whether the calendar ID 1301 corresponding to the selected deletion target calendar policy exists in the calendar policy invalidation list shown in FIG. 13. Upon determining that the calendar ID exists, the process advances to step S2008. Upon determining that the calendar ID does not exist, the process advances to step S2007. In step S2008, the calendar policy managing unit 303 deletes the selected deletion target calendar policy from the calendar policy invalidation list shown in FIG. 13, thereby avoiding invalidation.

After the process of step S2008 or S2006, in step S2007, the calendar policy managing unit 303 transmits, to the printing apparatus 102, an instruction to add the event policy that conflicts with the selected deletion target calendar policy. After that, the process of step S2004 is performed.

In this embodiment, the administrator imposes an access limitation to setting of event policies and calendar policies from the UI operation unit 213 so as to prevent the UI operation unit 213 of the managing apparatus 101 from operating (adding/deleting) an event policy or calendar policy.

An example will be described below in which the above-described contents are applied to a use case. For example, assume that event policies "power off entire printing apparatus in case of paper jam" and "return entire printing apparatus to on (power on) if paper jam is avoided" are defined. Also assume that calendar policies "set PowerOn at 9:00 every morning" and "set PowerOff at 22:00 every night" are defined.

The policies are registered in the event policy list and the calendar policy list, as shown in FIGS. 9C and 10C. The conditions of conflict are registered as in the example of the policy conflict list shown in FIG. 12B. Note that "change to PowerOff in case of paper jam" is assumed to be given higher priority than "set PowerOn according to calendar policy" in the policy conflict list. In addition, "set PowerOff according to calendar policy" is assumed to be given higher priority than "set PowerOn upon paper jam recovery".

If paper jam has occurred in the printing apparatus 102, the printing apparatus 102 is instructed to temporarily invalidate the calendar policy from the policy conflict list shown in FIG. 12B in accordance with the priority. This can prevent the printing apparatus from being powered on according to the calendar policy even if paper jam continues. If paper jam is avoided, the calendar policy invalidated by the printing apparatus 102 is validated, and the operation transits to an operation according to the calendar policy.

As another example, event policies "set sleep in case of toner low" and "set normal status when toner amount has returned to normal" are assumed to be set. In addition, calendar policies "set normal status at 9:00 every morning", "set sleep from 12:00 to 13:00 in lunch break", and "set sleep at 22:00 every night" are assumed to be set. The event policies are configured as shown in FIG. 9D, and the calendar policies are configured as shown in FIG. 10D. The policy conflict list is configured as shown in FIG. 12C. However, the priorities in the policy conflict list comply with the user setting. With these policies, during toner low, the printing apparatus is not powered on according to the calendar policy. When refilled with toner, the printing apparatus is powered on or set in the sleep status according to the calendar policy.

[Second Embodiment]

This embodiment is different from the first embodiment in event policy addition processing and calendar policy addition processing. In this embodiment, a managing apparatus 101 displays a basic policy setting screen shown in FIG. 23 on an output device 205 in accordance with a user instruction on the main screen. A UI control unit 306 can select a power saving priority mode by a button 2301 or a continuous use priority mode by a button 2302 in advance on the basic policy setting screen shown in FIG. 23. Upon detecting the press of the button 2301 or 2302 and the press of an OK button 2303, the UI control unit 306 stores, in a memory 202 of the managing apparatus 101, information representing which one of the power saving priority mode and the continuous use priority mode is selected. The information stored in the memory 202 is used as a criterion to determine whether the power saving priority mode or continuous use priority mode is set in a priority order table shown in FIG. 26.

Figure 24:
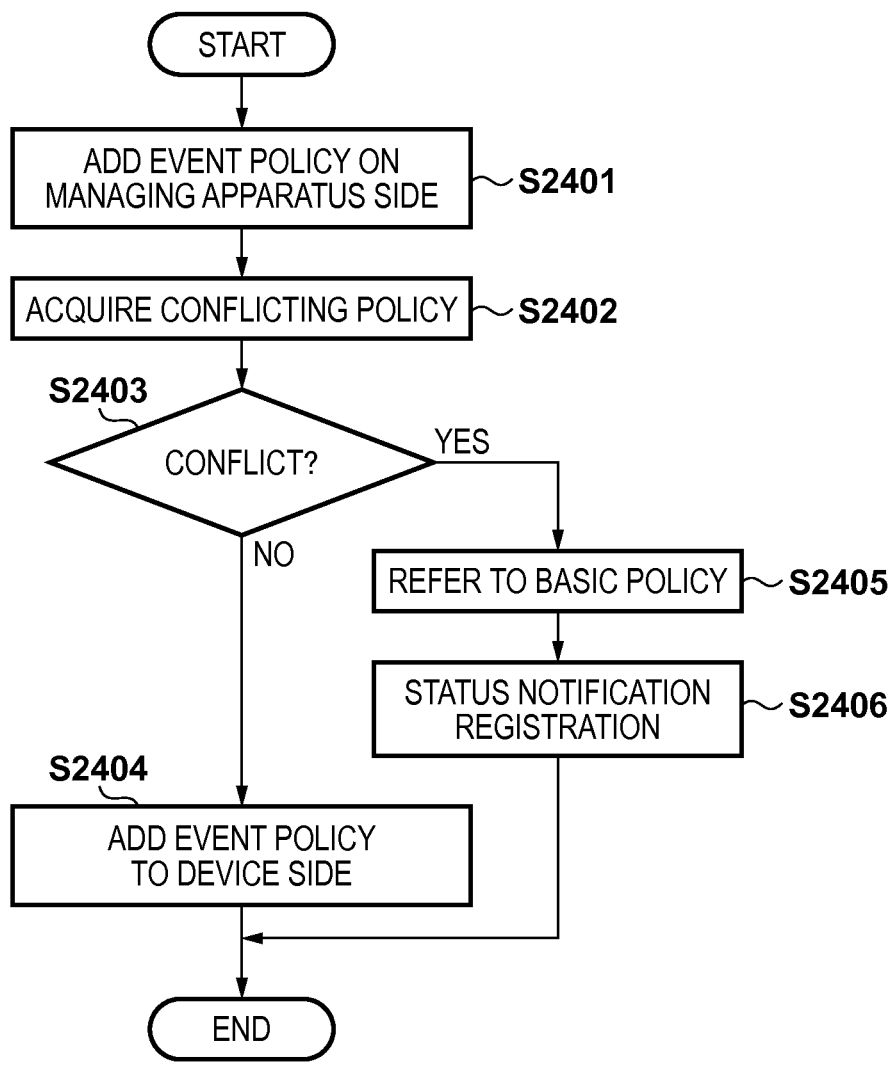
FIG. 24 is another flowchart showing processing of adding an event policy.

FIG. 24 is a flowchart showing the procedure of event policy addition processing according to this embodiment. Upon receiving an event policy addition instruction, the UI control unit 306 of the managing apparatus 101 displays an event policy addition screen shown in FIG. 7A on the output device 205. In an event policy addition screen 701 shown in FIG. 7A, selection of an event from the user is received on a device status list 702. In addition, selection of a power status after a change is received on a power status list 704 in correspondence with the selected event. Furthermore, selection of a part whose power status is to be changed is received on a part list 703.

In step S2401, an event, a power status, and a part necessary for event registration are selected on the event policy addition screen shown in FIG. 7A, and an event policy managing unit 302 detects the press of an OK button 705. The event policy managing unit 302 adds the event policy to the event policy list shown in FIG. 9A.

In step S2402, the event policy managing unit 302 searches the calendar policy list shown in FIG. 10A for a calendar policy having a power status different from the power status set in the added event policy. That is, the event policy managing unit 302 checks whether a conflict exists concerning the added event policy. In step S2403, the event policy managing unit 302 determines whether there exists a calendar policy that conflicts with the added event policy. The criterion in the determination of step S2403 is the same as described for step S403. Upon determining in step S2403 that there exists no conflicting calendar policy, the event policy managing unit 302 sends an event policy addition request to a printing apparatus 102 using the command shown in FIG. 14A in step S2404. Upon determining in step S2403 that there exists a conflicting calendar policy, the process advances to step S2405. In step S2405, the event policy managing unit 302 acquires the priority order table shown in FIG. 26 which is stored in an HDD 203 or the like, and refers to a value corresponding to the mode received on the basic policy setting screen shown in FIG. 23.

As shown in FIG. 26, the priority order table defines the priority order of each of a plurality of power statuses 2601 for each of a power saving priority mode 2602 and a continuation priority mode 2603. Referring to FIG. 26, the smaller the number of a power status is, the higher the priority order is. That is, in the power saving priority mode 2602, offHard (power-off of the apparatus) has the highest priority, and On (power-on of the apparatus) has the lowest priority. On the other hand, in the continuation priority mode 2603, On (power-on of the apparatus) has the highest priority, and offHard (power-off of the apparatus) has the lowest priority. That is, if an event policy and a calendar policy conflict, the policy having smaller power consumption is given the priority in the power saving priority mode. In the continuation priority mode, the continuity of the current processing is emphasized, and the policy having larger power consumption is given the priority.

In step S2405, the event policy managing unit 302 decides, based on the priority order shown in FIG. 26, which one of the event policy and the calendar policy is to be given the priority. The event policy managing unit 302 describes priority information 1204 representing which one of the event policy and the calendar policy is given the priority in the policy conflict list shown in FIG. 12. In step S2406, a device status monitoring unit 305 sends the device status registration request shown in FIG. 17A to the printing apparatus 102. Upon receiving the registration request, a device status notifying unit 314 of the printing apparatus 102 adds a status ID 1803 and a notification destination IP address 1802 having the same contents as an event policy ID 1202 to the status notification list shown in FIG. 18.

Figure 25:
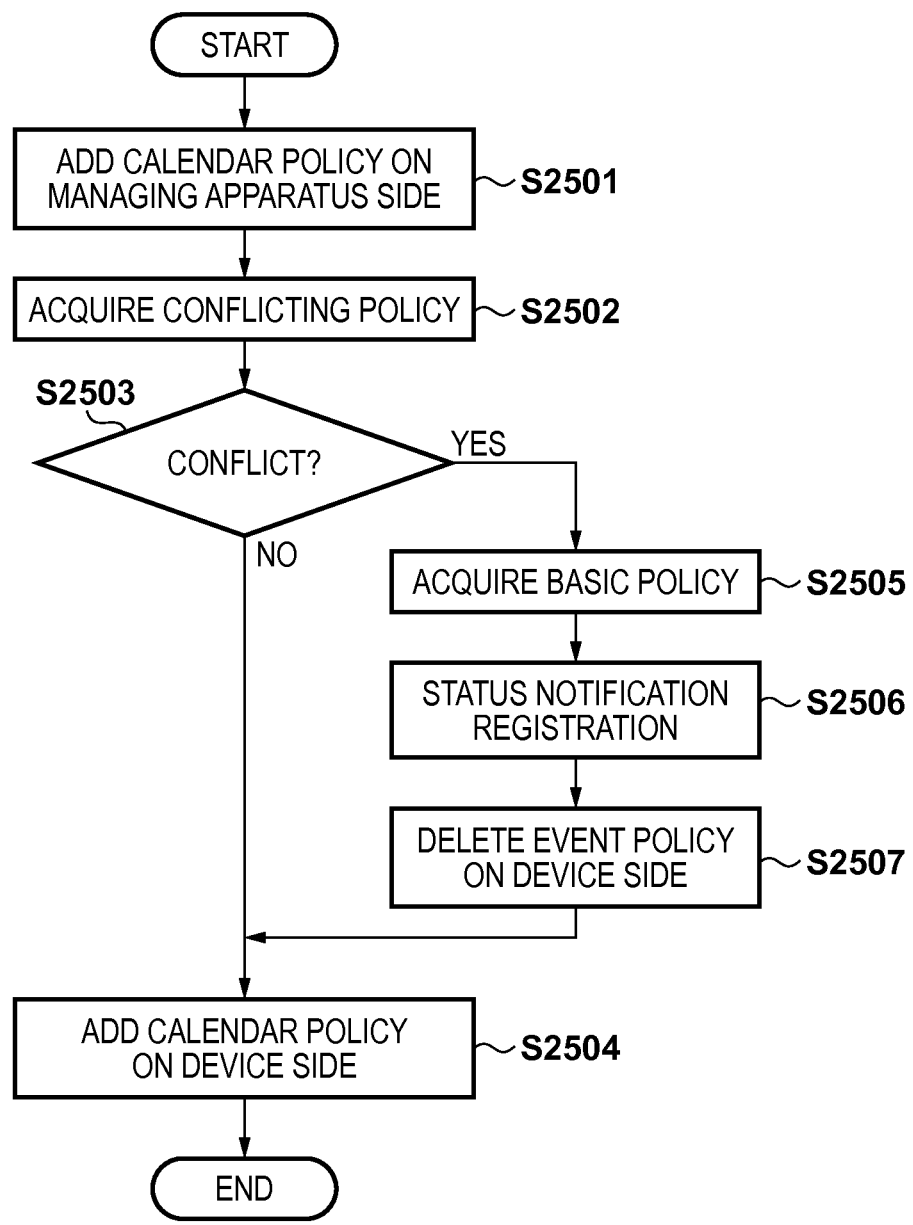
FIG. 25 is another flowchart showing processing of adding a calendar policy.

FIG. 25 is a flowchart showing the procedure of calendar policy addition processing according to this embodiment. Upon receiving a calendar policy addition instruction, the UI control unit 306 of the managing apparatus 101 displays a calendar policy addition screen shown in FIG. 7B on the output device 205. In a calendar policy addition screen 711 shown in FIG. 7B, selection of a date/time is received on a power status change start date/time 712. In addition, selection of a part whose power status is to be changed is received on a part list 713. Furthermore, selection of a power status after a change is received on a power status list 714.

In step S2501, a date/time, a power status, and a part necessary for calendar registration are selected on the calendar policy addition screen shown in FIG. 7B, and a calendar policy managing unit 303 detects the press of an OK button 715. The calendar policy managing unit 303 adds the calendar policy to the calendar policy list shown in FIG. 10A.

In step S2502, the calendar policy managing unit 303 searches the event policy list shown in FIG. 9A for an event policy having a power status different from the power status set in the added calendar policy. That is, the calendar policy managing unit 303 checks whether a conflict exists concerning the added calendar policy. In step S2503, the calendar policy managing unit 303 determines whether there exists an event policy that conflicts with the added calendar policy. The criterion in the determination of step S2503 is the same as described for step S503. Upon determining in step S2503 that there exists no conflicting event policy, the calendar policy managing unit 303 sends a calendar policy addition request to the printing apparatus 102 using the command shown in FIG. 15A in step S2504. Upon determining in step S2503 that there exists a conflicting event policy, the process advances to step S2505. In step S2505, the calendar policy managing unit 303 acquires the priority order table shown in FIG. 26 which is stored in the HDD 203 or the like, and refers to a value corresponding to the mode received on the basic policy setting screen shown in FIG. 23.

In step S2505, the calendar policy managing unit 303 decides, based on the priority order shown in FIG. 26, which one of the event policy and the calendar policy is to be given the priority. The calendar policy managing unit 303 describes the priority information 1204 representing which one of the event policy and the calendar policy is given the priority in the policy conflict list shown in FIG. 12. In step S2506, the device status monitoring unit 305 sends the device status registration request shown in FIG. 17A to the printing apparatus 102. Upon receiving the registration request, the device status notifying unit 314 of the printing apparatus 102 adds the status ID 1803 and the notification destination IP address 1802 having the same contents as the event policy ID 1202 to the status notification list shown in FIG. 18.

In step S2507, the event policy managing unit 302 sends a conflicting event policy deletion request to the printing apparatus 102 using the command shown in FIG. 14B. After step S2507, the process of step S2504 is performed.

In this embodiment as well, if a status change (event) has occurred in the printing apparatus 102, each process of the flowchart of FIG. 6 is executed. In this embodiment, the basic policy is set in advance. If an event policy and a calendar policy conflict with each other, the priority can be decided without causing the user to select one of the event policy and the calendar policy to be given the priority every time.

[Third Embodiment]

In this embodiment, priority is always given to an event policy without determining which one of a calendar policy and an event policy should be given the priority. For this reason, in this embodiment, it is unnecessary to cause the user to designate which one of an event policy and a calendar policy should be given the priority, and the conflict warning screen shown in FIG. 11 and the policy conflict list shown in FIG. 12 are unnecessary.

Figure 28:
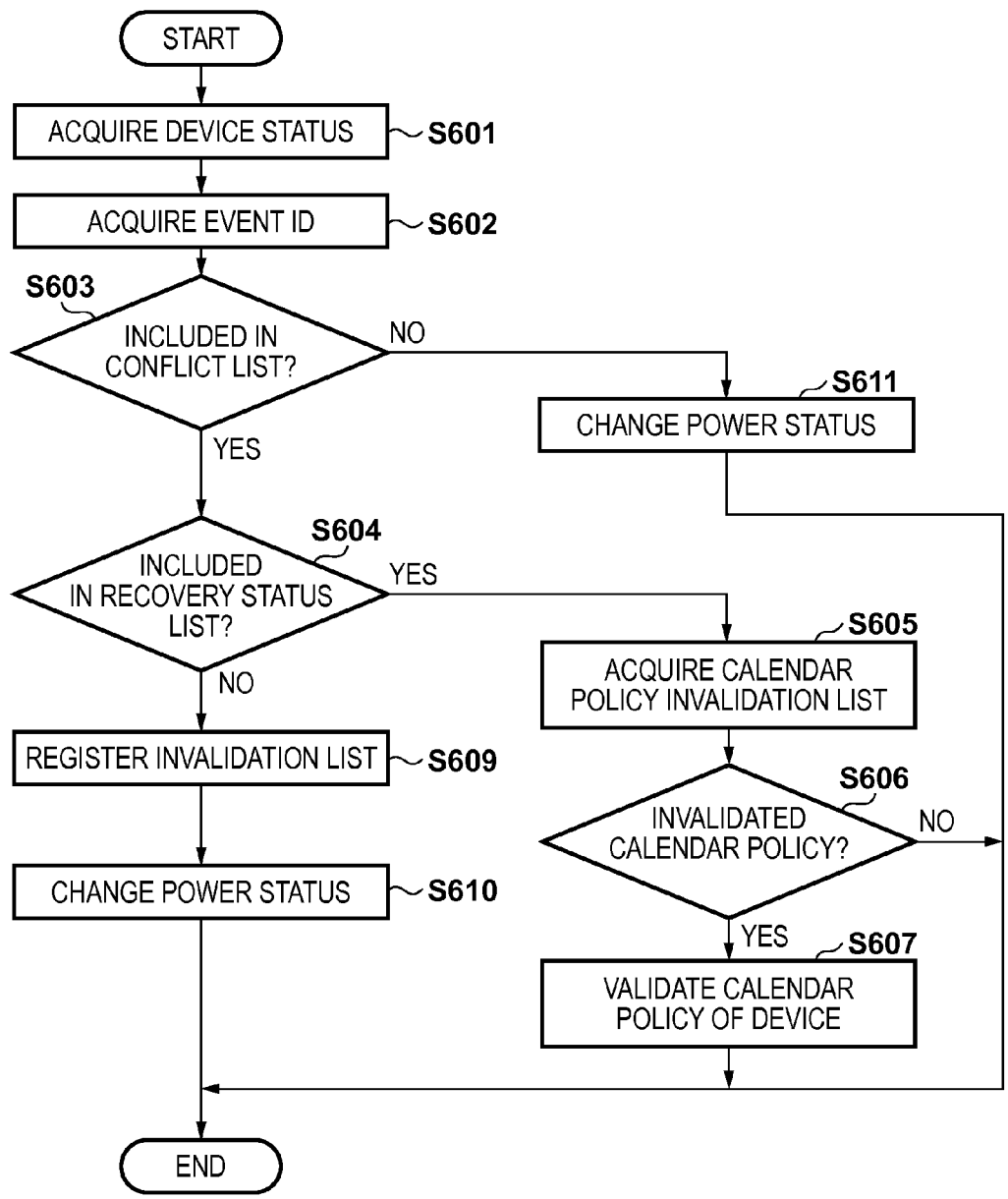
FIG. 28 is a flowchart showing processing when a status change has occurred in a printing apparatus according to the third embodiment.

FIG. 28 is a flowchart showing processing when a status change has occurred in the printing apparatus according to this embodiment.

Referring to FIG. 28, the process of step S608 in FIG. 6 according to the first embodiment is absent, and the process advances from step S604 (No) to step S609. The rest is the same as in the processing of FIG. 6, and a description thereof will be omitted.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-099831, filed May 13, 2014 and 2015-073217, filed Mar. 31, 2015, which are hereby incorporated by reference herein in their entirety.

What is claimed is:

1. A managing apparatus for managing an image forming apparatus, comprising:
    a first power control unit configured to control a power status of the image forming apparatus to transit to a first power status in accordance with a schedule;
    a second power control unit configured to control the power status of the image forming apparatus to transit to a second power status in accordance with a notification of event occurrence from the image forming apparatus;
    a determination unit configured to, upon receiving the notification from the image forming apparatus, determine whether the first power status and the second power status match each other;
    a selection unit configured to, in a case where the determination unit determines that the first power status and the second power status do not match each other, select one of the first power status and the second power status based on priority information representing which one of power control by the first power control unit and power control by the second power control unit is given priority; and
    a managing unit configured to prohibit power control by the second power control unit in a case where the first power status is selected by the selection unit, and invalidate power control by the first power control unit in a case where the second power status is selected by the selection unit,
    wherein the first power control unit, the second power control unit, the determination unit, the selection unit, and the managing unit are implemented by a processor and a memory.

2. The apparatus according to claim 1, further comprising an acquisition unit configured to acquire the priority information in a case where the determination unit determines that the first power status and the second power status do not match each other,
    wherein the selection unit selects one of the first power status and the second power status based on the priority information acquired by the acquisition unit, and
    wherein the acquisition unit is implemented by the processor and the memory.

3. The apparatus according to claim 2, further comprising an accepting unit configured to accept the priority information,
    wherein the acquisition unit acquires the priority information accepted by the accepting unit,
    wherein the accepting unit is implemented by the processor and the memory.

4. The apparatus according to claim 3, wherein the accepting unit accepts selection of one of power control by the first power control unit and power control by the second power control unit as the priority information.

5. The apparatus according to claim 3, wherein in a case where the event has occurred, the accepting unit further accepts selection of one of giving priority to power saving of the image forming apparatus and giving priority to continuation of processing that is being executed by the image forming apparatus, and the selection unit selects one of the first power status and the second power status based on the selection accepted by the accepting unit.

6. The apparatus according to claim 5, further comprising a first storage unit configured to store a priority order between a plurality of power statuses of the image forming apparatus in a case where the priority is given to power saving of the image forming apparatus,
wherein in a case where the accepting unit accepts selection of giving the priority to power saving of the image forming apparatus, the selection unit selects one of the first power status and the second power status based on the priority order stored in the first storage unit, and
wherein the first storage unit is implemented by the memory.

7. The apparatus according to claim 5, further comprising a second storage unit configured to store a priority order between a plurality of power statuses of the image forming apparatus in a case where the priority is given to continuation of processing that is being executed by the image forming apparatus,
wherein in a case where the accepting unit accepts selection of giving the priority to continuation of processing that is being executed by the image forming apparatus, the selection unit selects one of the first power status and the second power status based on the priority order stored in the second storage unit, and
wherein the second storage unit is implemented by the memory.

8. The apparatus according to claim 1, further comprising:
a second determination unit configured to determine whether the event that has occurred in the image forming apparatus is a recovery event from an error: and
a third determination unit configured to, in a case where the second determination unit determines that the event is the recovery event, determine whether there is the schedule corresponding to the power control invalidated by the managing unit,
wherein in a case where the third determination unit determines that there is the schedule corresponding to the invalidated power control, the managing unit validates the power control of the schedule, and
wherein the second determination unit and the third determination unit are implemented by the processor and the memory.

9. A managing method executed by a managing apparatus for managing an image forming apparatus, the method comprising:
a first power control step of controlling a power status of the image forming apparatus to transit to a first power status in accordance with a schedule
a second power control step of controlling the power status of the image forming apparatus to transit to a second power status in accordance with a notification of event occurrence from the image forming apparatus;
a determination step of, upon receiving the notification from the image forming apparatus, determining whether the first power status and the second power status match each other;
a selection step of, in a case where it is determined in the determination step that the first power status and the second power status do not match each other, selecting one of the first power status and the second power status based on priority information representing which one of power control by the first power control step and power control by the second power control step is given priority; and
a managing step of prohibiting power control by the second power control step in a case where the first power status is selected in the selection step, and invalidating power control by the first power control step in a case where the second power status is selected in the selection step.

10. A non-transitory computer-readable storage medium storing a program that causes a computer to execute each step of a managing method of claim 9.

11. A managing apparatus for managing an image forming apparatus, comprising:
a first power control unit configured to control a power status of the image forming apparatus to transit to a first power status in accordance with a schedule;
a second power control unit configured to control the power status of the image forming apparatus to transit to a second power status in accordance with a notification of event occurrence from the image forming apparatus;
a determination unit configured to, upon receiving the notification from the image forming apparatus, determine whether the first power status and the second power status match each other; and
a managing unit configured to control the power status of the image forming apparatus by either the first power control unit or the second power control unit based on priority information representing which one of power control by the first power control unit and power control by the second power control unit is given priority, in a case where the determination unit determines that the first power status and the second power status do not match each other,
wherein the first power control unit, the second power control unit, the determination unit, and the managing unit are implemented by a processor and a memory.

12. The apparatus according to claim 11, wherein the managing unit invalidates power control by the first power control unit based on the priority information.

13. The apparatus according to claim 12, further comprising:
a second determination unit configured to determine whether the event that has occurred in the image forming apparatus is a recovery event from an error: and
a third determination unit configured to, in a case where the second determination unit determines that the event is the recovery event, determine whether there is the schedule corresponding to the power control invalidated by the managing unit,
wherein in a case where the third determination unit determines that there is the schedule corresponding to the invalidated power control, the managing unit validates the power control corresponding to the schedule.

* * * * *